United States Patent [19]

Rachelson

[11] Patent Number: 6,157,706
[45] Date of Patent: *Dec. 5, 2000

[54] METHOD AND APPARATUS FOR ENABLING A FACSIMILE MACHINE TO BE AN E-MAIL CLIENT

[75] Inventor: Tevya A. Rachelson, San Francisco, Calif.

[73] Assignee: E-Centric, Incorporated, San Francisco, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/858,779

[22] Filed: May 19, 1997

[51] Int. Cl.[7] .................................................. H04M 11/00
[52] U.S. Cl. ................................ 379/100.08; 379/93.24; 379/90.01
[58] Field of Search ........................... 379/100.08, 93.24, 379/93.15, 93.26, 90.01, 92.04, 93.05, 93.18, 93.27, 142, 100.09; 358/400, 407, 440, 464

[56] References Cited

U.S. PATENT DOCUMENTS

| | | | |
|---|---|---|---|
| 4,941,170 | 7/1990 | Herbst | 379/100.07 |
| 4,989,238 | 1/1991 | Iggulden et al. | 379/100.02 |
| 5,068,888 | 11/1991 | Sherk et al. | 379/100.11 |
| 5,115,326 | 5/1992 | Burgess et al. | 358/440 |
| 5,206,743 | 4/1993 | Hochman et al. | 358/440 |
| 5,339,156 | 8/1994 | Ishii | 358/402 |
| 5,392,338 | 2/1995 | Danish et al. | 379/93.27 |
| 5,406,557 | 4/1995 | Baudoin | 370/61 |
| 5,448,626 | 9/1995 | Kajiya et al. | 379/67 |
| 5,452,099 | 9/1995 | Von Meister | 358/403 |
| 5,454,030 | 9/1995 | de Oliveria et al. | 379/100 |
| 5,459,584 | 10/1995 | Gordon et al. | 358/434 |
| 5,473,143 | 12/1995 | Vak et al. | 235/380 |
| 5,479,411 | 12/1995 | Klein | 370/110.1 |
| 5,513,126 | 4/1996 | Harkins et al. | 364/514 A |
| 5,515,175 | 5/1996 | Okada | 358/402 |
| 5,519,507 | 5/1996 | Subramaniam et al. | 358/402 |
| 5,521,719 | 5/1996 | Yamada | 358/438 |
| 5,530,740 | 6/1996 | Irribarren et al. | 379/89 |
| 5,555,100 | 9/1996 | Bloomfield et al. | 358/402 |
| 5,557,671 | 9/1996 | Enodh | 379/52 |

(List continued on next page.)

FOREIGN PATENT DOCUMENTS

| | | | |
|---|---|---|---|
| 402158250A | 6/1990 | Japan | H04M 1/274 |
| 403267849A | 11/1991 | Japan | H04M 1/23 |
| WO97/23082 | 6/1997 | WIPO | H04M 1/00 |
| WO97/23990 | 7/1997 | WIPO | H04N 1/00 |

OTHER PUBLICATIONS

Web page for NetXchange: The internet Fax Solution URL= http://www.ntxc.com, 6 pages, Apr. 4, 1997.

(List continued on next page.)

*Primary Examiner*—Curtis A. Kuntz
*Assistant Examiner*—Melur Ramakrishnaiah
*Attorney, Agent, or Firm*—Squire, Sanders & Dempsey L.L.P.

[57] ABSTRACT

A method and apparatus that allow users having access to a facsimile (fax) machine to send, receive, and manage e-mail easily. If the user selects a "Direct Receipt" receive mode, e-mail is automatically sent to his fax machine, where it is automatically printed out and can be read. If the user selects "Receipt on Demand" mode, the user calls a predetermined telephone number and answers voice prompts to instruct the system where to fax his (held) unread e-mail. The user can also be notified of unread e-mail being held, via pager or telephone. In either case, the fax received by the user contains the contents of the e-mail message intended for the user. To send e-mail from his fax machine, the user uses an "address book" of e-mail addresses, each of which is associated with a fax telephone number (also called an "internet fax number"). If the user sends a fax message to an internet fax number associated with a particular recipient in the user's address book, the system sends an e-mail message containing the contents of the fax message to the recipient associated with the internet fax number.

13 Claims, 28 Drawing Sheets

U.S. PATENT DOCUMENTS

| | | | |
|---|---|---|---|
| 5,559,611 | 9/1996 | Bloomfield et al. | 358/407 |
| 5,588,009 | 12/1996 | Will | 371/33 |
| 5,608,786 | 3/1997 | Gordon | 379/100.08 |
| 5,619,725 | 4/1997 | Gordon | 395/839 |
| 5,657,381 | 8/1997 | Hughes-Hartogs | 397/100.12 |
| 5,767,985 | 6/1998 | Yamamoto et al. | 358/402 |

OTHER PUBLICATIONS

Web page for Faxaway: The Premier Email to Fax Service URL=http://www.faxaway.com, 2 pages, publication date unknown.

Web page for FAXiNET (sm) FAQ URL=http://www.awa.com/faxinet/faq.html, 3 pages, publication date unknown.

Web page for NetCentric—Home Page URL=http://www.netcentric.com, 2 pages, publication date unknown.

Web page for AimQuest Corporation: AimFax URL=http://www.aimquest.com/aimfax.html, 2 pages, publication date unknown.

Web page for Fax2Net–Techinfo—Page URL=http://www.fax2net.com/how_it_work.html, 2 pages, publication date unknown.

Web page for FaxSav Family of Services URL=http://www.faxsav.com, 6 pages, publication date unknown, portions copyright 1997.

Web page for FAXWEB URL=http://www.faxweb.net, 4 pages, publication date unknown, portions copyright 1996.

Web page for Uniterra URL=http://www.uniterra.com, 3 pages, publication date unknown, portions copyright 1995–1997.

Web page for Digital Mail International Home Page URL=http://www.u–net.com/digitalm, 3 pages, publication date unknown.

Web page for Digital Mail International Home Page—Digital Mail Limited URL=http://www.digitalmail.com, 2 pages, publication date unknown.

Web page for JFAX Personal Telecom URL=http://www.j-fax.com, 2 pages, publication date unknown.

List of Abstracts, 9 pages, Jul. 20, 1997.

WO 97/10668; Kulakowski; Internet facsimile system; PCT; entire document Mar. 20, 1997.

Web Page for IETF; Internet Fax (fax) URL=http://www.ietf.org/html.charters/fax–charter.html, 3 pgs, publication date unknown.

Niel Joffe, Dan Wing, Charles Kline, "Capabilities Exchange and Immediate Delivery Over ESMTP," Jul. 11, 1997, draft document located at URL=http://www.imc.org/draft–ietf–fax–transport, 17 pgs.

"FaxNet Never Busy Fax Trial Offer" Promotional–Trial Offer Material, 2 pgs., publication date unknown.

Hirokuni Tsuji, Hiroshi Kawamura, Kazuko Wakayama, Satoshi Kikuchi, "A Mail and Protocol Conversion Node for ISDN Facsimile Application", IEEE Network Magazine pp. 17–20, Sep. 1989.

Denise Pappalardo, "The Internet to the Switched Telephone Network–Move Over: Faxing Over the Internet is the Latest Popular ISP Service", Network World, p. 10, Jul. 14, 1997.

James E. Gaskin, "Faxing Across the Net", Information Week, pp. 54–55 & 59, Jun. 23, 1997.

"Consolidation Messages", PC Magazine, p. 40, Jan. 7, 1997.

Lynne, Conklin, Balden, "The UNIX–Fax Connection", UNIX Review, vol. 9, No. 1, pp. 48–54, & 57, publication date unknown.

Steven Baker, "Satellites and Faxes On the Internet", UNIX Review, pp. 23–26, 28, 30 & 32, Dec. 1993.

MESSAGE PATH DIAGRAM

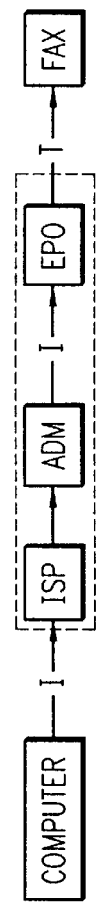
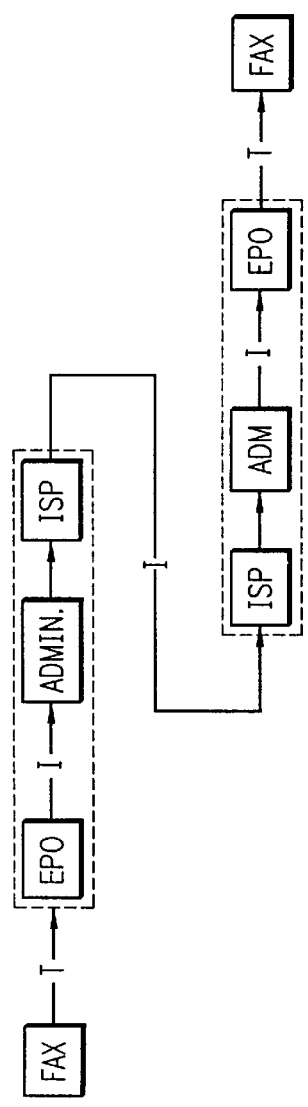
FIG. 4(A) COMPUTER TO FAX MACHINE
FIG. 4(B) FAX MACHINE TO COMPUTER
FIG. 4(C) FAX MACHINE TO FAX MACHINE

FIG. 9(A)

ADDRESS BOOK

| ADDRESS BOOK ID | INTERNET FAX NUMBER | E-MAIL ADDRESS |
|---|---|---|
| 1 | XXX-XXX-XXXX | AAAAAAA |
| 2 | XXX-XXX-XXXX | BBBBBBBBBB |
|  | XXX-XXX-XXXX |  |
|  | XXX-XXX-XXXX |  |
|  | XXX-XXX-XXXX |  |
|  | XXX-XXX-XXXX |  |
|  | XXX-XXX-XXXX |  |
|  | XXX-XXX-XXXX |  |

↑ NEXT AVAILABLE TELEPHONE NUMBER FOR THIS USER

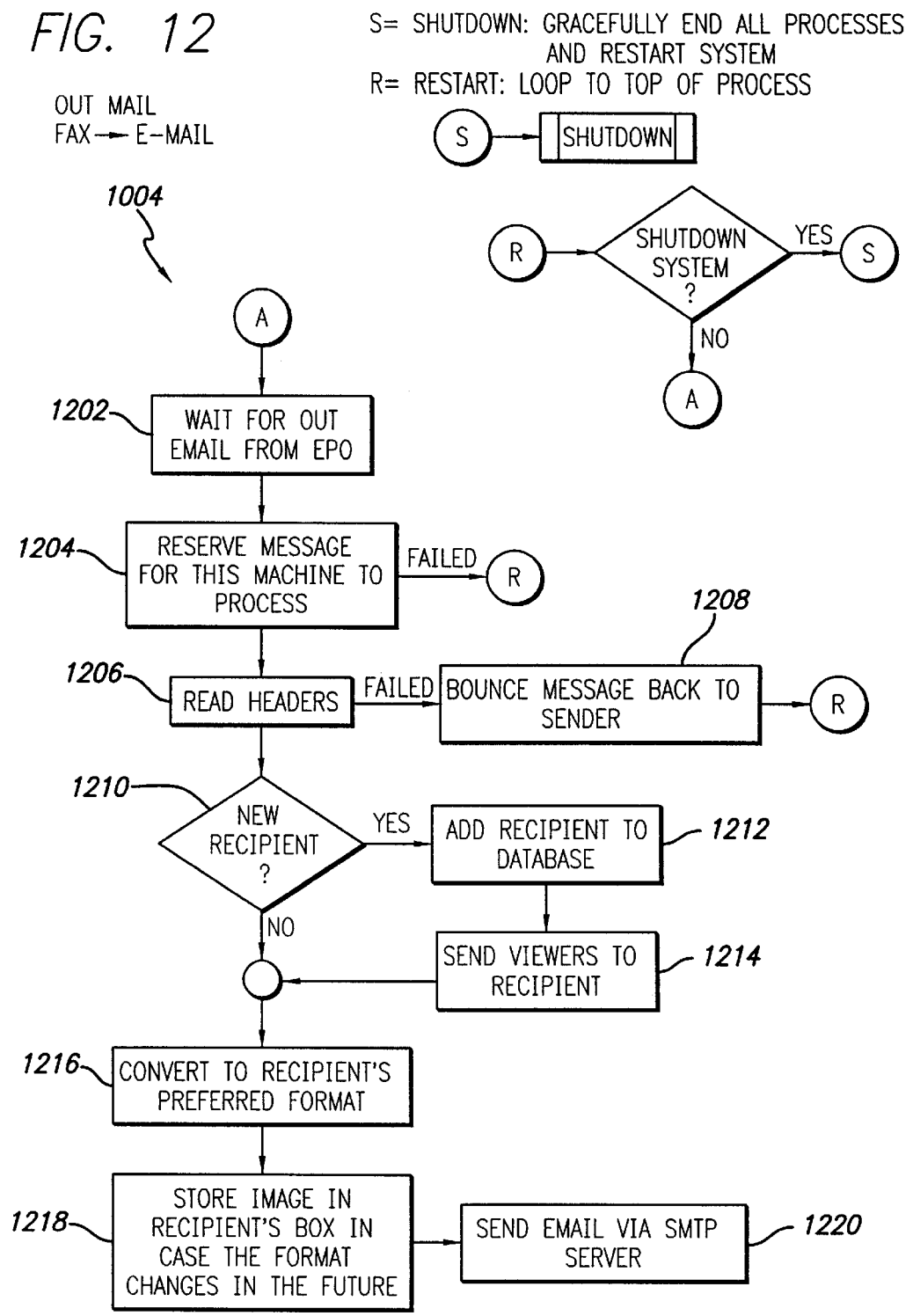

ELECTRONIC POST OFFICE (EPO) OVERVIEW

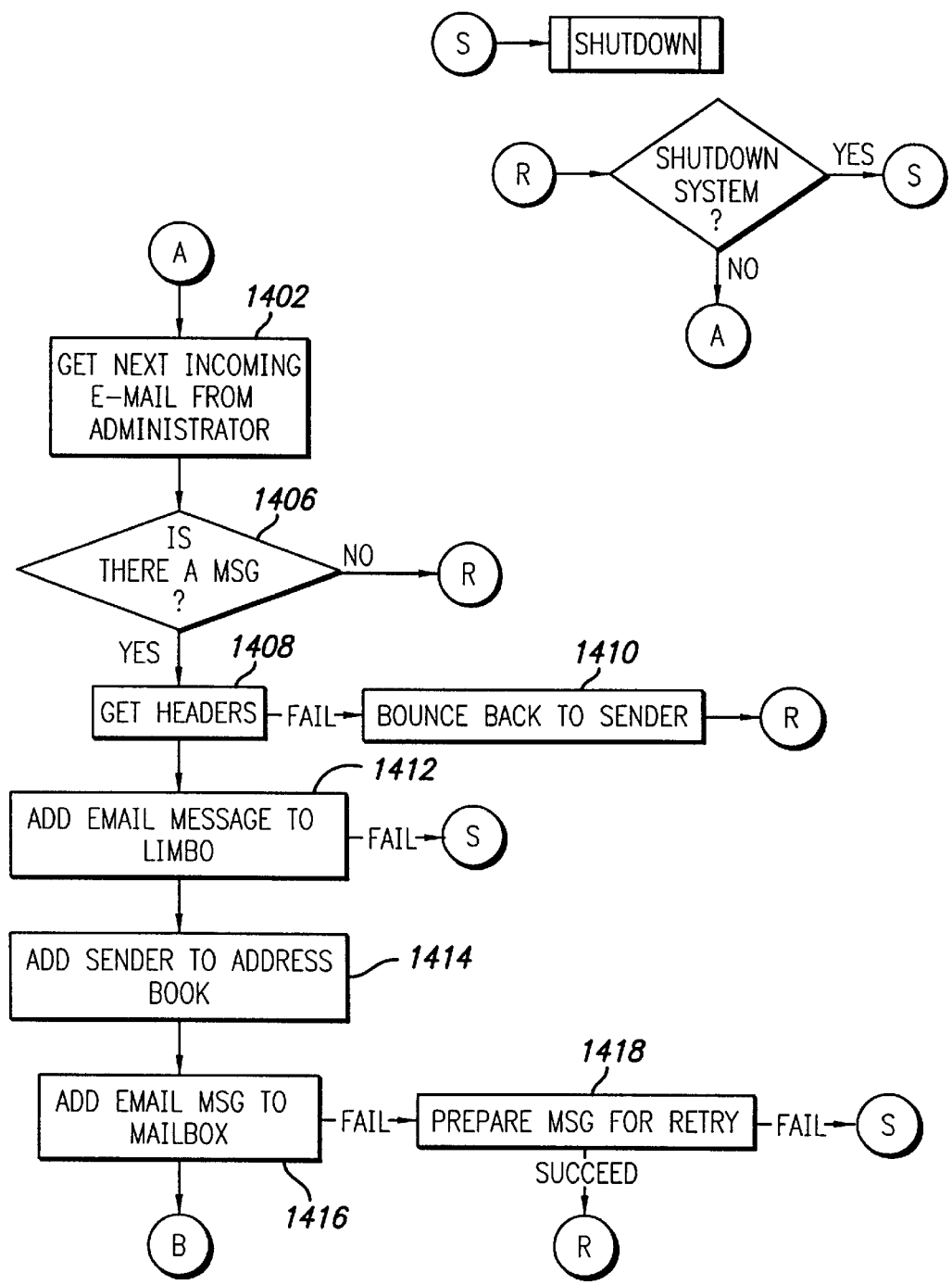
FIG. 14(A) DISPATCHER PROCESSING

QUEUE PROCESSOR: ENQUEUER

QUEUE PROCESSOR: ACKNOWLEDGER

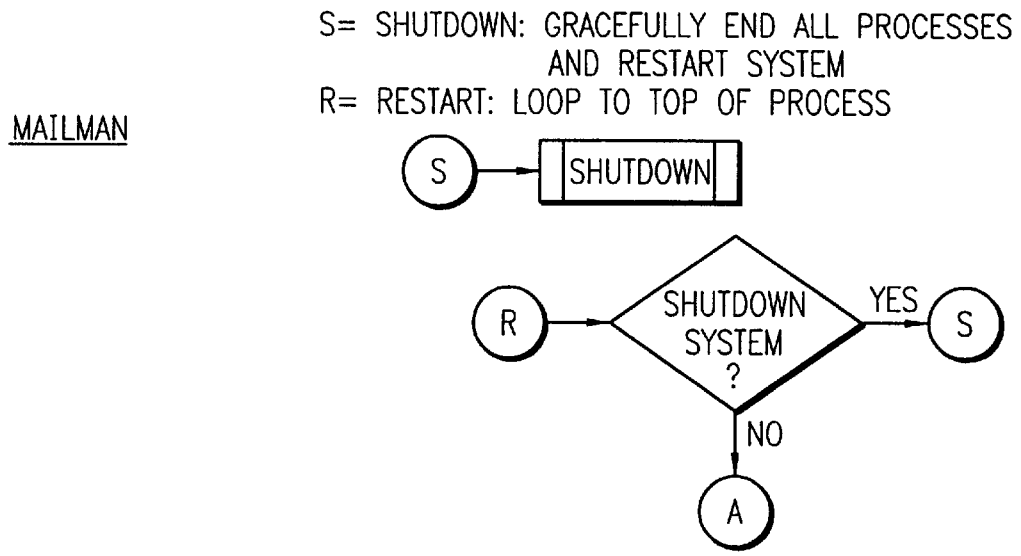
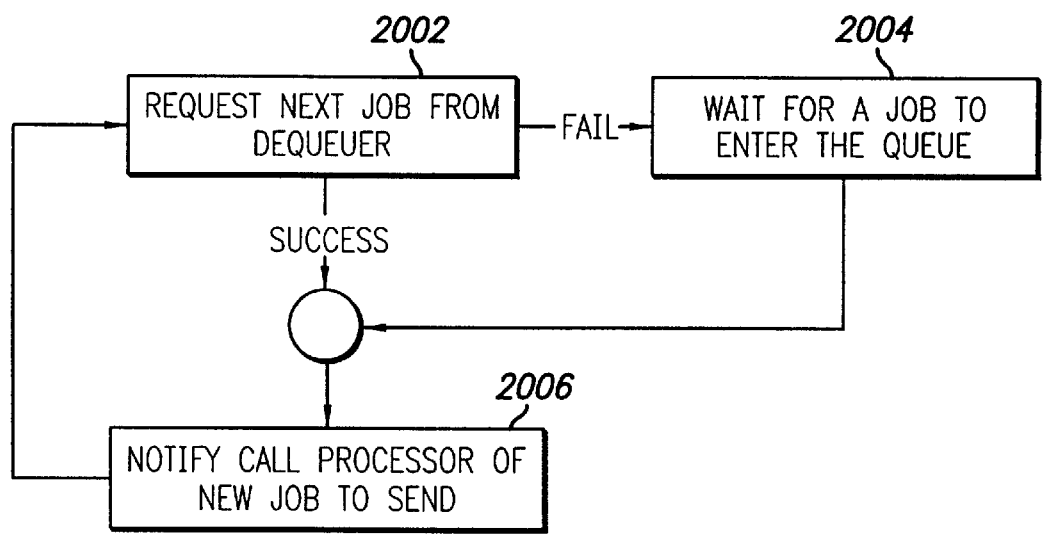
FIG. 20

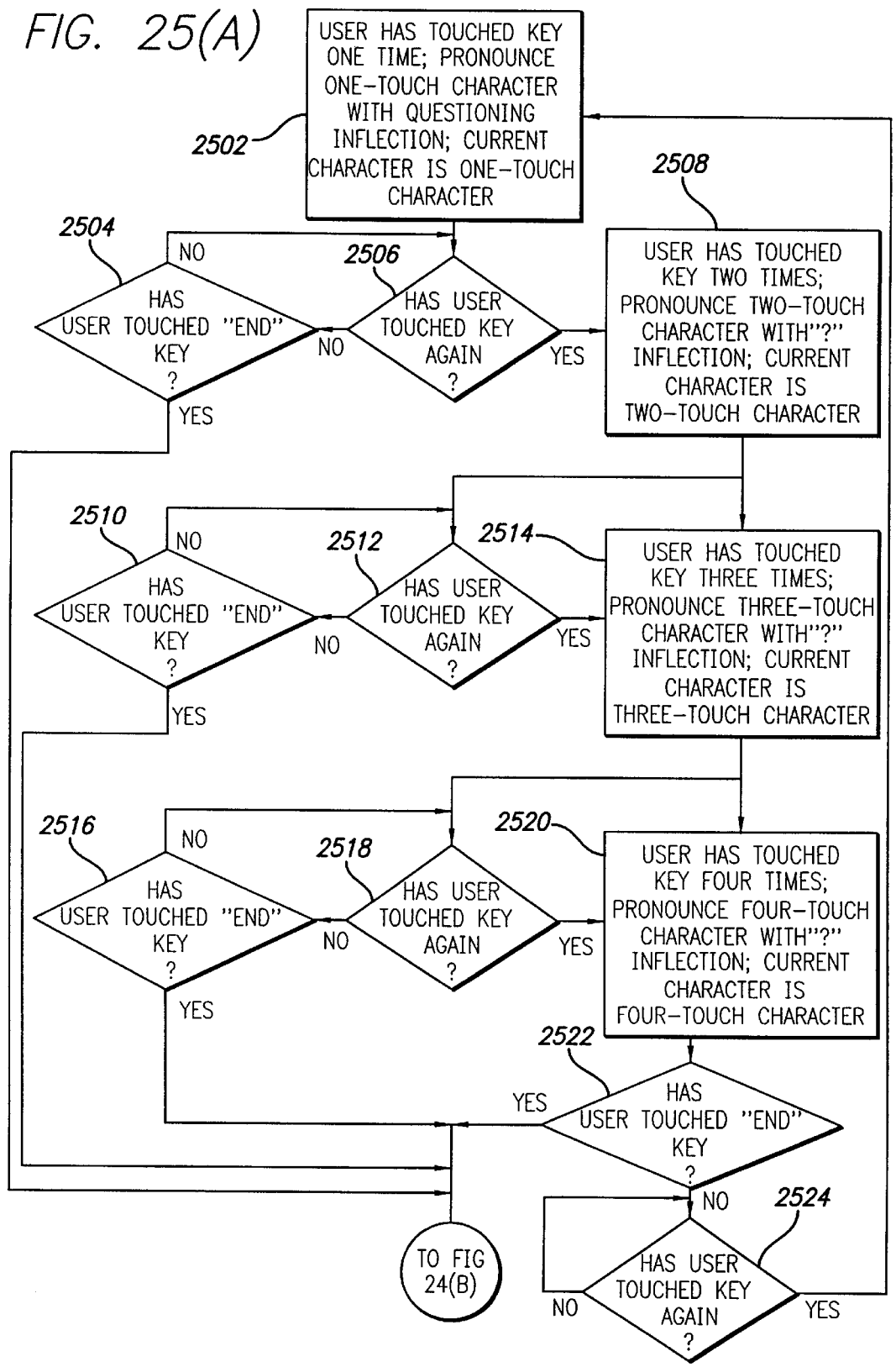

METHOD AND APPARATUS FOR ENABLING A FACSIMILE MACHINE TO BE AN E-MAIL CLIENT

FIELD OF THE INVENTION

This application relates to telecommunications and, specifically, to a method and apparatus for enabling a facsimile machine to behave as an e-mail client.

BACKGROUND OF THE INVENTION

In recent years, e-mail has become extremely popular. People with a personal computer can send and receive e-mail messages to and from other computer users. In addition, people can use their personal computers to send e-mail to multiple users at once.

E-mail has several advantages over other methods of sending information. It is cheap, since e-mail messages can be sent anywhere in the world over the internet at no incremental cost. E-mail is efficient, because it can be broadcast to a few or to thousands of people quickly and effortlessly. E-mail maintains the quality of the message. The readability and sharpness of the message remains the same no matter how many times it is sent. E-mail is auditable because messages can be saved or logged for easy access. E-mail is private, as long as individuals have their own separate e-mail addresses protected by their own password. Lastly, e-mail is schedule-free because users do not have to coordinate schedules to conduct e-mail correspondence.

Unfortunately, not all people in the world have access to a computer. Some people do not have access to a computer at any time. These people cannot send or receive e-mail via conventional methods. Other people do not have a portable computer that they take with them when they leave their home or office. These people are cut off from their e-mail when they travel. Most people, however, usually have access to a facsimile (fax) machine. Since many conventional computers can send faxes over the telephone lines, conventional computers can send faxes to persons having a fax machine.

One problem with sending a conventional fax, however, is that the recipients at the fax machine cannot send return e-mail, since they do not have access to a computer. While people with a fax machine can send faxes that can be received by a computer, the receiving computer must be active in order to receive the fax. The convenience of e-mail, where a recipient can receive e-mail whether or not he is aware that it is coming is not available for faxes sent to/from a PC.

Another problem with sending a conventional fax from a computer, instead of just sending e-mail, is that the procedures for sending a fax from a computer and for sending e-mail from a computer are different. Thus, a sender at a computer has to remember that a specific recipient needs to be sent a fax (as opposed to e-mail) and to use the correct sending procedure. This is not convenient for the sender.

Another problem with sending a conventional fax from a computer is that sending a fax can incur long distance charges while sending e-mail via a network such as the internet only incurs network usage charges, which do not vary with the amount of data sent.

Moreover, if an entire office at the fax recipient's end has only a single fax machine, it is not possible for a sender to direct the fax to a specific person for private reception. What is needed is a way for owners of fax machines to easily send and receive e-mail that is, at the same time, transparent to persons using a computer to send and receive e-mail.

Many telephonic information systems allow the user to enter alphanumeric characters using the keys of a touchtone telephone. Many users find this method of entering characters confusing. What is needed is a way of allowing the user to enter an alphanumeric character via a touch tone keypad without causing confusion.

SUMMARY OF THE INVENTION

The present invention overcomes the problems and disadvantages of the prior art by allowing users having access to a facsimile (fax) machine to send and receive e-mail easily. Specifically, the present invention allows a fax machine to behave like an e-mail client. An e-mail client is a mechanism through which one can send and receive electronic messages. An e-mail client can also manage past messages.

In a preferred embodiment of the present invention, the user can select one of two receive modes for receiving his e-mail. If the user selects a "Direct Receipt" receive mode, received e-mail is automatically sent to the user's designated fax machine, where it is printed out immediately. In contrast, if the user selects a "Receipt on Demand" receive mode, the user calls a predetermined telephone number and answers voice prompts to instruct the system where to fax his unread e-mail. Optionally, the user can be automatically notified that a message is waiting (either via pager or via a telephone message). In either case, the fax received by the user contains the contents of the e-mail message intended for the user.

Sending e-mail is also simple. The user establishes an "address book" of e-mail addresses of potential e-mail recipients or sets of recipients (such as a mailing list). Each e-mail address in the address book is associated with a fax number (also called an "internet fax number"). If the user faxes a message to a telephone number associated with a particular recipient in the user's address book, the system sends an e-mail message containing the contents of the fax message to the e-mail address of the recipient(s) associated with the internet fax number.

Entries are made in a user's address book in two ways. An entry is made when a user receives e-mail from someone for the first time. In this case, the sender's e-mail address is added to the recipient's address book, and a facsimile number (an internet fax number) is associated with the e-mail address. The user can also make entries in his address book by calling a predetermined telephone number and responding to voice prompts to manually enter a new e-mail address to be placed in his address book. The system will vocally inform the user of the internet fax number associated with the entered e-mail address, and printed on the faxed message.

In a preferred embodiment, e-mail faxed by a user is sent to the recipient in a graphical format, such as GIF, TIF, or PostScript (for easy printing). Thus, the user can e-mail graphics to another person by faxing them to the recipient's internet fax number.

In accordance with the purpose of the invention, as embodied and broadly described herein, the invention relates to a system that enables a facsimile machine to behave like an e-mail client, comprising: a portion that receives an e-mail message addressed to a first user from a second user, the e-mail message including the e-mail address of the second user; a portion that stores the e-mail address of the second user in a memory; a portion that associates a unique code with the stored e-mail address of the second user; and a portion that, when the system receives a facsimile message from the first user and the facsimile message is associated with a code that is the unique code assigned to the second user's stored e-mail address, sends the contents of the facsimile message to the e-mail address of the second user.

In further accordance with the purpose of the invention, as embodied and broadly described herein, the invention relates to a system that enables a facsimile machine to behave like an e-mail client, comprising: a portion that accepts input from a first user specifying an e-mail address of a second user; a portion that stores the e-mail address of the second user in a memory; a portion that associates a unique code with the stored e-mail address of the second user; and a portion that, when the system receives a facsimile message from the first user and the facsimile message is associated with a code that is the unique code assigned to the second user's stored e-mail address, sends the contents of the facsimile message to the e-mail address of the second user.

In further accordance with the purpose of the invention, as embodied and broadly described herein, the invention relates to a method for enabling a facsimile machine to act as an e-mail client, comprising the steps, performed by a data processing system, of: receiving, from one of a computer system over the internet and a facsimile machine over telephone lines, an e-mail message addressed to a first user from a second user, and including an e-mail address of the second user; determining a telephone number of a facsimile machine assigned to the first user, in accordance with the e-mail address of the first user; and sending a facsimile message that contains the contents of the e-mail message to the determined telephone number.

In further accordance with the purpose of the invention, as embodied and broadly described herein, the invention relates to a method for enabling a facsimile machine to act as an e-mail client, comprising the steps, performed by a data processing system, of: receiving, from one of a computer system and a facsimile machine, an e-mail message addressed to a first user from a second user, and including an e-mail address of the second user; requesting from the first user, once the first user has requested that his e-mail be sent to him, a telephone number of a facsimile machine to which the first user wishes his e-mail to be faxed; receiving input from the first user specifying a telephone number of a facsimile machine; and sending, to the specified telephone number, a facsimile message that contains the contents of the e-mail message.

In further accordance with the purpose of the invention, as embodied and broadly described herein, the invention relates to a method for enabling a facsimile machine to act as an e-mail client, comprising the steps, performed by a data processing system, of: receiving a facsimile message, sent from a facsimile machine by a first user, where the facsimile machine dialed an internet fax number associated with a second user; determining the identity of the first user in accordance with a Customer Service ID of the facsimile machine; determining, from an address book data structure of the first user, an e-mail address of the second user, in accordance with the internet fax number dialed by the facsimile machine; and sending an e-mail message, containing the received facsimile message, to the second user at the determined e-mail address.

In further accordance with the purpose of the invention, as embodied and broadly described herein, the invention relates to a system that enables a facsimile machine to behave like an e-mail client, comprising: a portion that sends a first fax message to the facsimile machine, the first fax message including the contents of a first e-mail message sent by a second user to a first user, the first e-mail message including the e-mail address of the second user; and a portion that sends a second e-mail message to the second user in accordance with a second fax message received from the facsimile machine, the second fax message sent by the first user.

A further aspect of the present invention involves the way that the system vocally prompts the user when the user enters alphanumeric information via the keypad of a touch-tone telephone. As the user touches a key one, two, three, or four times, the system vocally echoes a corresponding character using a first, questioning inflection. Once the user touches an "end key (such as "#"), the system indicates that it has accepted the last character echoed by pronouncing the character again using a second, declarative inflection. Use of two different inflections provides a verbal cue for the user that the character was properly recorded. Such a verbal cue minimizes user confusion.

Objects and advantages of the invention will be set forth in part in the description which follows and in part will be obvious from the description or may be learned by practice of the invention. The objects and advantages of the invention will be realized and attained by means of the elements, method steps and combinations particularly pointed out in the appended claims and equivalents.

BRIEF DESCRIPTION OF THE DRAWINGS

The accompanying drawings, which are incorporated in and constitute a part of this specification, illustrate several embodiments of the invention and, together with the description, serve to explain the principles of the invention.

FIGS. 4(a) through 4(c) are block diagrams showing various paths taken by messages in the system of FIG. 1.

FIG. 9(a) shows an example format of an address book data structure.

FIG. 12 is a flow chart of steps performed by an OutMail process of FIG. 10.

FIG. 20 is a flow chart showing steps performed by a Mailman process of FIG. 13.

FIGS. 25(a) through 25(c) are flowcharts showing steps used in a preferred embodiment of the present invention to allow the user to enter alphanumeric characters via a keypad of a touchtone telephone.

DESCRIPTION OF THE PREFERRED EMBODIMENTS

Reference will now be made in detail to preferred embodiments of the invention, examples of which are illustrated in the accompanying drawings. Wherever possible, the same reference numbers will be used throughout the drawings to refer to the same or like parts.

I. System Overview

Figure 1:
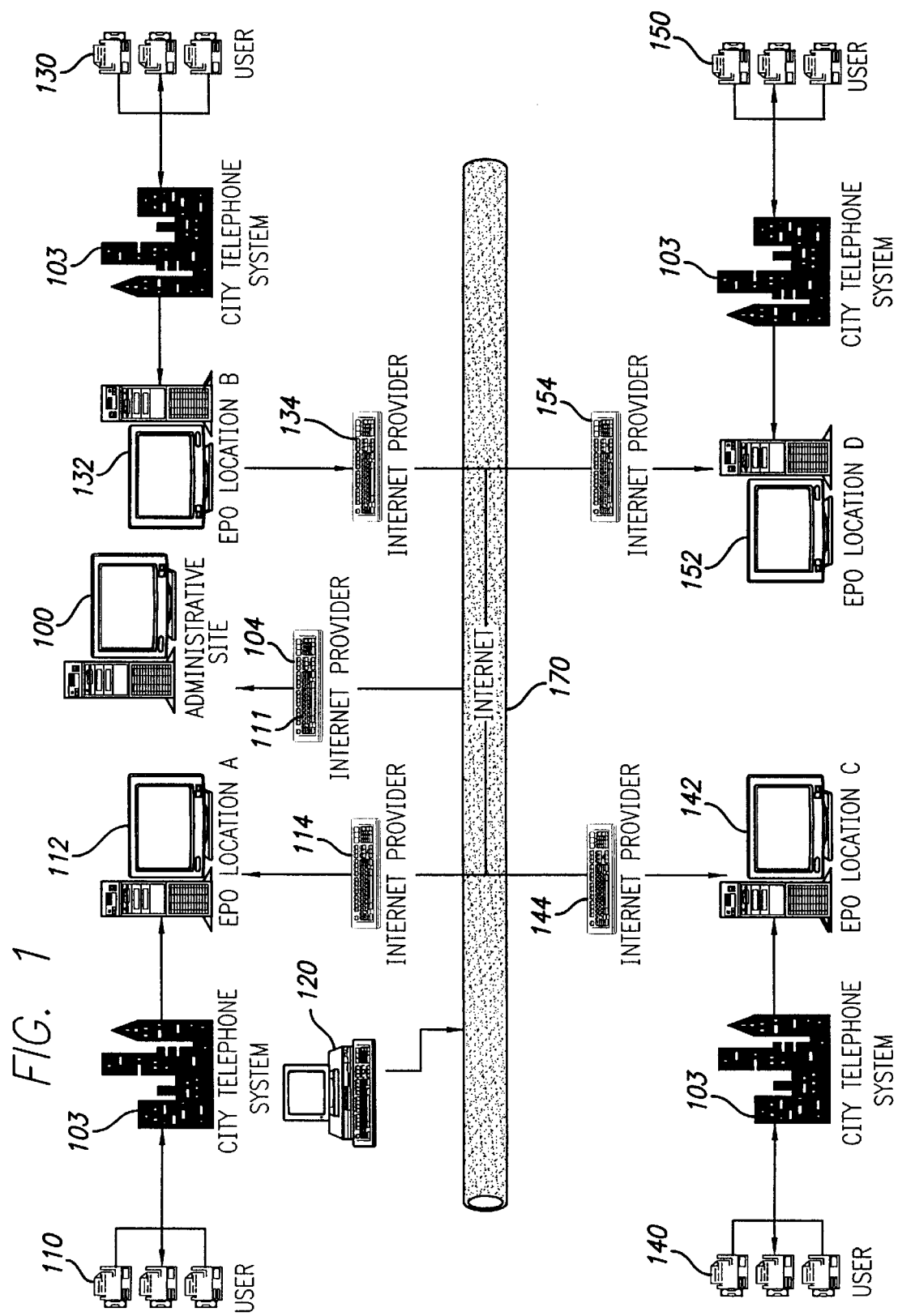
FIG. 1 is a block diagram showing an overview of a computer and telephone network usable by a preferred embodiment of the present invention.

FIG. 1 is a block diagram showing an overview of a computer and telephone network usable by a preferred embodiment of the present invention. FIG. 1 includes a plurality of users, such as users 110, 130,140, and 150. Each user is assumed to have access to a fax machine. The fax machines of users 110, 130,140, and 150 connect, via respective local/city telephone systems 103, to respective Electronic Post Offices (EPOs) 112, 132, 142, 152. The EPOs are in turn connected to respective Internet Service Providers (ISPs) 114,134, 144, 154, which are in turn connected to a network such as the internet. 170. It will be understood that the present invention can also be used in conjunction with networks other than the internet, such as intranets, for example. The invention can also be used with any appropriate combination of network types.

FIG. 1 further shows an administrative site 100, which connects to an ISP 111. It should be understood that administrative site 100 and at least one of the EPOs can be connected by the internet, as shown, but can alternately be connected by any other appropriate kind of network. This situation may occur, for example, if administrative site 100 and an EPO are located at the same physical location.

ISP 111 connects to a network such as the internet 170. FIG. 1 also shows a computer 120, which connects to the internet. Computer 120 (and the EPOs and administrative site) may connect to the internet via an ISP or may connect directly. Note that, because they use the internet, messages between administrative site 100 and the EPOs do not incur long distance phone charges. Calls between EPOs and users 110, 130, 140, and 150 preferably are local calls.

Figure 2:
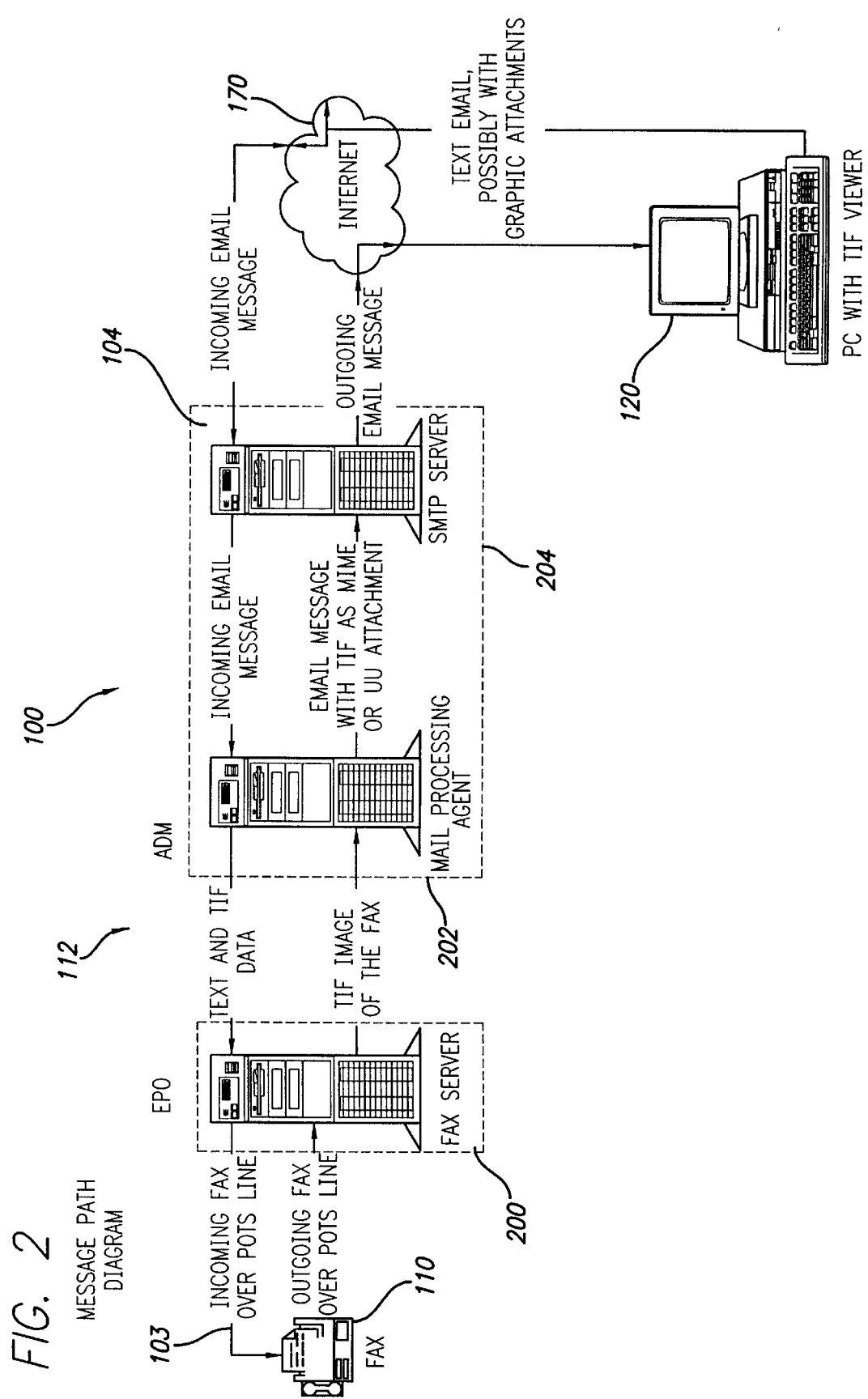
FIG. 2 is a block diagram of a path of a message in the system of FIG. 1.

FIG. 2 is a block diagram of a path of a message in the embodiment of FIG. 1. Messages pass though fax server 200 (in an EPO) and through administrative site 100, which includes a mail processing agent 202 and an SMTP server 204.

Figure 3:
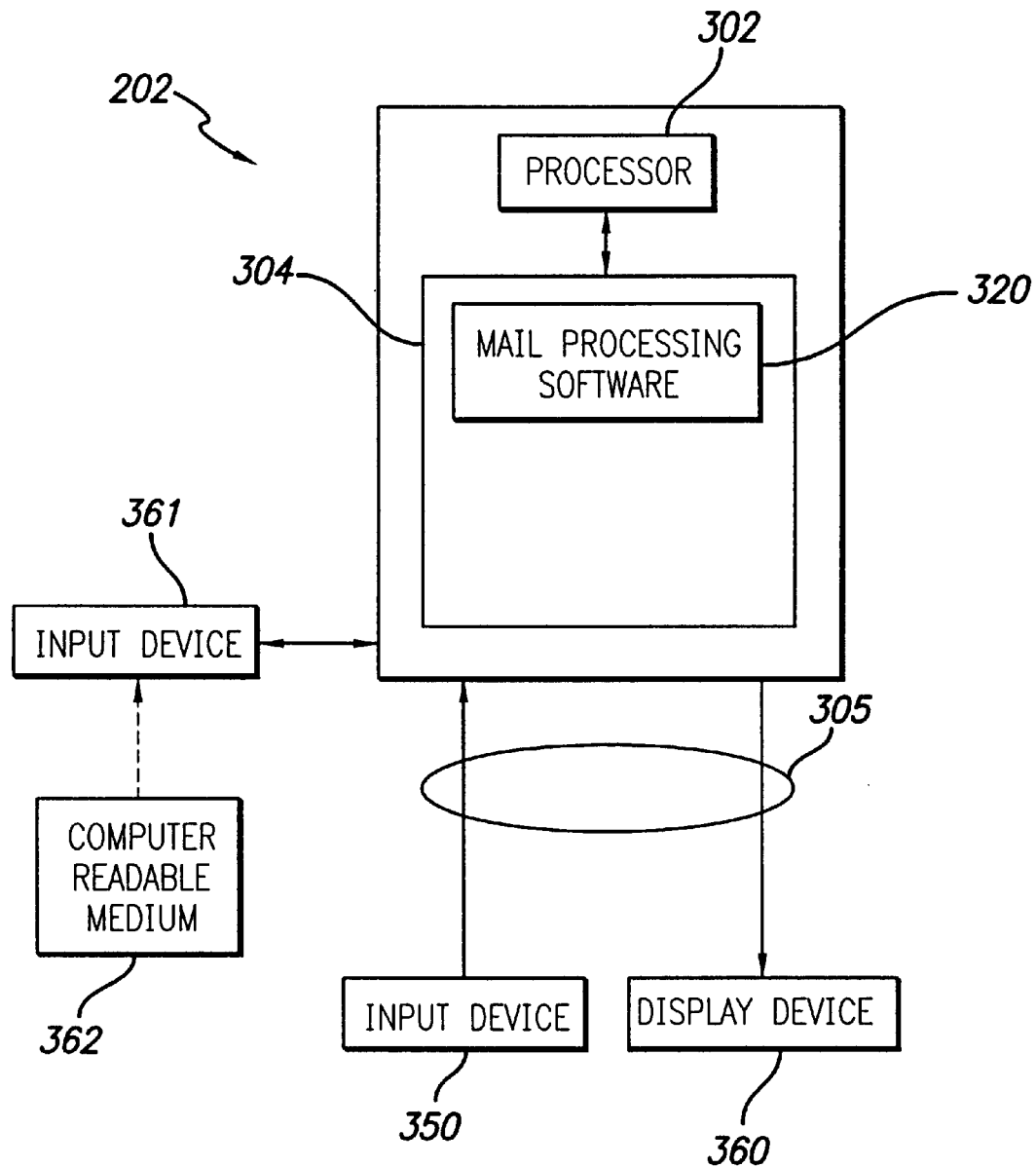
FIG. 3 is a block diagram of a computer system used in accordance with a preferred embodiment of the present invention.

FIG. 3 is a block diagram of a computer system used in accordance with the embodiment of FIG. 1. Although FIG. 3 shows an implementation of mail processing agent 202, a person of ordinary skill in the art will appreciate that fax server 200 SMTP server 204, and EPOs 112, 142, 152 are implemented in a similar fashion.

In FIG. 3, computer system 204 includes a processor 302; a memory 304; input/output lines 305; an input device 350, such as a keyboard or mouse; and a display device 360, such as a display terminal. Computer 204 also includes an input device 361, such as a floppy disk drive or CD ROM reader, that reads computer instructions stored on computer readable medium 362, such as a floppy disk or a CD ROM. These computer instructions are the instructions of e.g., mail processing 320. The EPOs of FIG. 1 each include a database, as described in further detail below, and have voice boards, fax boards, and call processing software to control their operation.

A person of ordinary skill in the art will understand that memory 304 also contains additional information, such as application programs, operating systems, data, etc., which are not shown in the figure for the sake of clarity. It also will be understood that computer system 204 can also include numerous elements not shown in the Figure for the sake of clarity, such as disk drives, keyboards, display devices, network connections, additional memory, additional CPUs, LANs, internet connections, input/output lines, etc.

In the following discussion, it will be understood that the steps of methods and flow charts discussed preferably are performed by processor 302 (or similar processors) executing instructions stored in memory, such as instructions of mail processing software 320. It will also be understood that, the invention is not limited to any particular implementation or programming technique and that the invention may be implemented using any appropriate techniques for implementing the functionality described herein. In the described embodiment administrative site 100 is written in the C++ programming language and runs under the Windows 95 operating system. ("Windows 95" is a trademark of Microsoft, Inc.). The EPOs are preferably written in VOS (Voice Operating System) for DOS. VOS is available from Parity Software. The present invention, however, is not limited to any particular programming language or operating system.

FIGS. 4(a) through 4(c) are block diagrams showing various paths taken by messages in the system of FIG. 1. FIG. 4(a) shows a path for an e-mail message sent from a computer to a fax machine. In the figures, lines having a "I" represent travel over the internet 170 (or other appropriate network), while lines having a "T" represent travel over a telephone system 103. In FIG. 4(a), an e-mail message addressed to a customer of the system is sent by a computer, such as computer 120 of FIG. 1, to an ISP, such as ISP 111 of administrative site 100 via the internet. Administrative site 100 sends the message to the EPO associated with the user's receiving fax machine, which forwards the message to the user's fax machine, such as user fax machine 130, via the telephone lines. If a facsimile machine is a designated facsimile machine of the first user, the EPO determines a telephone number of the facsimile machine, in accordance with an e-mail address of the first user and sends the first facsimile message to the determined telephone number. Thus, each facsimile machine user has his or her own e-mail address at which he or she receives e-mail.

FIG. 4(b) shows a path for an e-mail message sent from a fax machine of a customer of the system to a computer. An e-mail message is sent by a user fax machine, such as user machine 130 of FIG. 1 via the telephone lines to an EPO associated with the fax machine (e.g., in the same calling area as the fax machine). The EPO sends the message to administrative site 100, which sends an e-mail message containing the contents of the fax message to computer 120, via the internet.

FIG. 4(*c*) shows a path for an e-mail message sent from a first fax machine to a second fax machine. (Actually, each of these paths is a combination of sending a fax from a first user who has an account with the system to a second user who has an account with the system). An e-mail message is sent by the first user fax machine, such as user machine 130 of FIG. 1 via the telephone lines to an associated first EPO. The first EPO sends the fax message to administrative site 100, which sends the message as an e-mail over the internet to the second customer of the system. Because e-mail for the second customer goes to administrative site 100, the administrative site receives the e-mail intended for its second customer, converts it to a fax message, and sends the fax message to a second EPO associated with the second user's fax machine. The EPO sends the fax to the user's fax machine via telephone lines 103. The message does not necessarily have to go through an ISP to return to administrative site 100. It would just be processed as outgoing and incoming ee-mail at the administrative site without going through an ISP.

II. User Telephone Interface

FIGS. 5–8 are flow diagrams showing an organization of a user input menu in a preferred embodiment of the present invention. The user places a voice call to a predetermined telephone number of an EPO (preferably a local EPO, to save on long distance charges). The EPO interacts with the user to prompt the user and process the user's responses to the prompts. The user prompts are preferably spoken via a recorded or synthesized voice. The user enters his responses by using the keys on a touchtone telephone. The system described below is called an Interactive Voice Response (IVR) system. Using the IVR, the user can perform activities such as entering e-mail addresses in his address book and retrieving (under certain circumstances) his held e-mail messages. The user can also change various system parameters.

Figure 5:
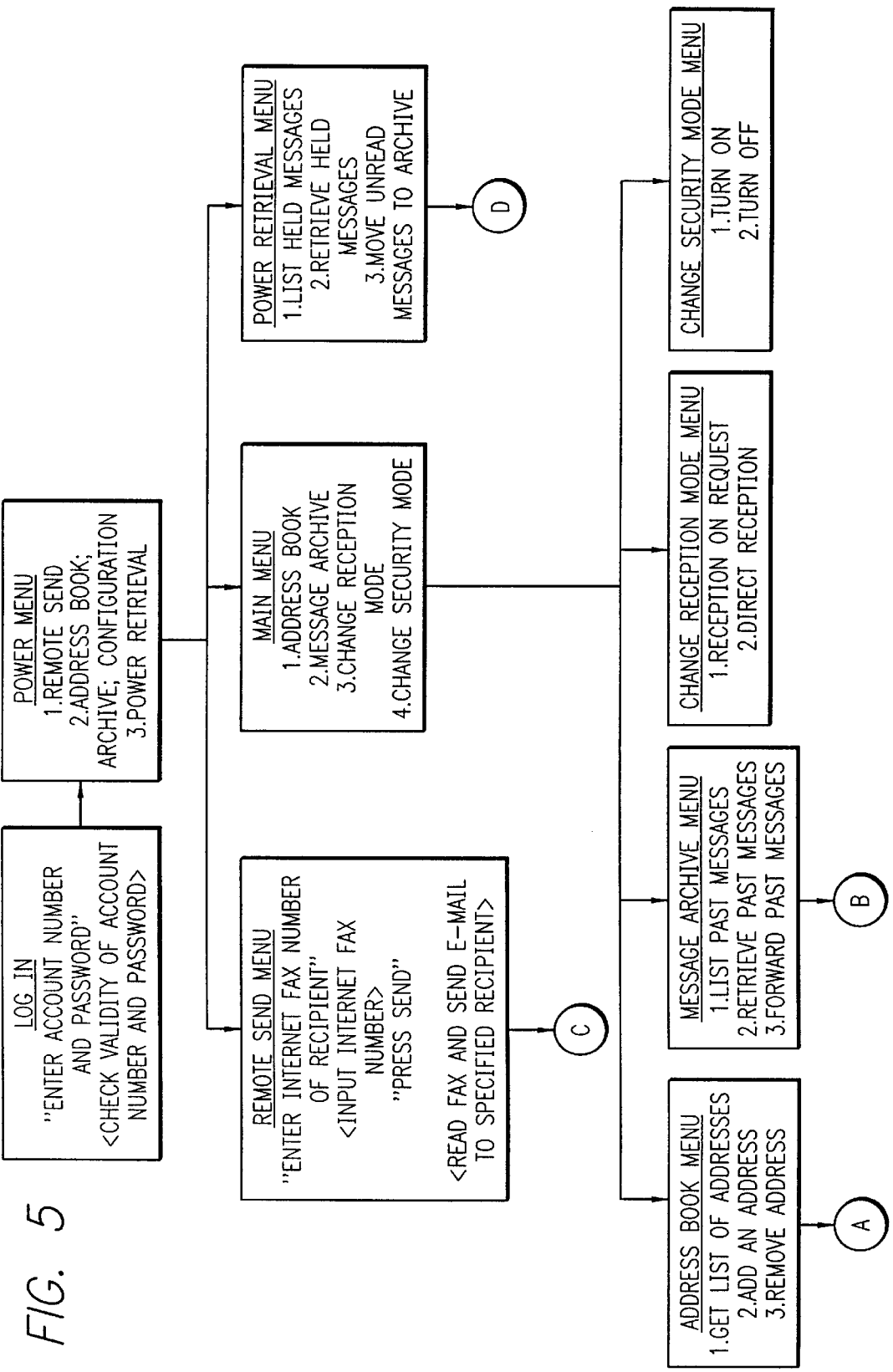
FIGS. 5–8 are flow diagrams showing an organization of a user input menu.

As shown in FIG. 5, the user must first log in to the EPO by entering his account number and password. The described IVR Power-user menu has three main choices: Remote send; a main menu (including an address book, archive operations, and configuration options); and Power retrieval. Various systems may allow certain users to perform some subset of the following functions. For example, in the described embodiment, some users are not allowed to perform remote retrieval. Instead, all their messages are sent to their default fax machine as soon as the messages are received It should be understood that the IVR system described herein is presented for purposes of example and should not be taken to limit the present invention in any way. Any interface, whether an IVR system or some other type of system, can be used with the present invention, as long as it enables the user to manage basic functions such as sending, receiving, the address book function, and archives.

a) Remote Send

If the user selects "Remote send," the user is prompted for the recipient's internet fax number. After the user enters the internet fax number and presses the "send button" on the fax machine, the system receives the facsimile message and sends an e-mail message to e-mail address of the person associated with the entered internet fax number for the user. The e-mail message contains the contents of the facsimile message.

b) Main menu (Address Book, message archive, reception and security modes)

i) Address Book

The address book feature of the described embodiment allows the system to save e-mail addresses so that the user does not have to enter them each time. The user can send a message to a person whose address is in the address book by faxing the message from his registered fax machine to the internet fax number assigned to that person in the address book. Each time e-mail is received by the user from someone who has previously not sent the user e-mail, the system automatically makes an entry in the address book. The user can also manually add people to his address book as shown in FIG. 6.

FIG. 9(*a*) shows an example format of the address book data structure. Each user has an address book containing N internet fax numbers. In a preferred embodiment, an EPO has 1000 internet fax numbers assigned to it, so N is equal to 1000. (Other implementations can use other values of N). Each user has the same N internet fax numbers in his address book (though some may not be assigned). The system determines to which e-mail address to send a message faxed by a particular user by first locating the address book for the current user and then by doing a lookup operation on the internet fax number dialed/entered by the user to send the fax. Thus, for each user, an internet fax number is a "unique code" identifying potential recipients of e-mail from the user.

If the user selects the "address book," option, the user is prompted to choose between three more options: get list of addresses; add an address; and remove an address.

Figure 6:
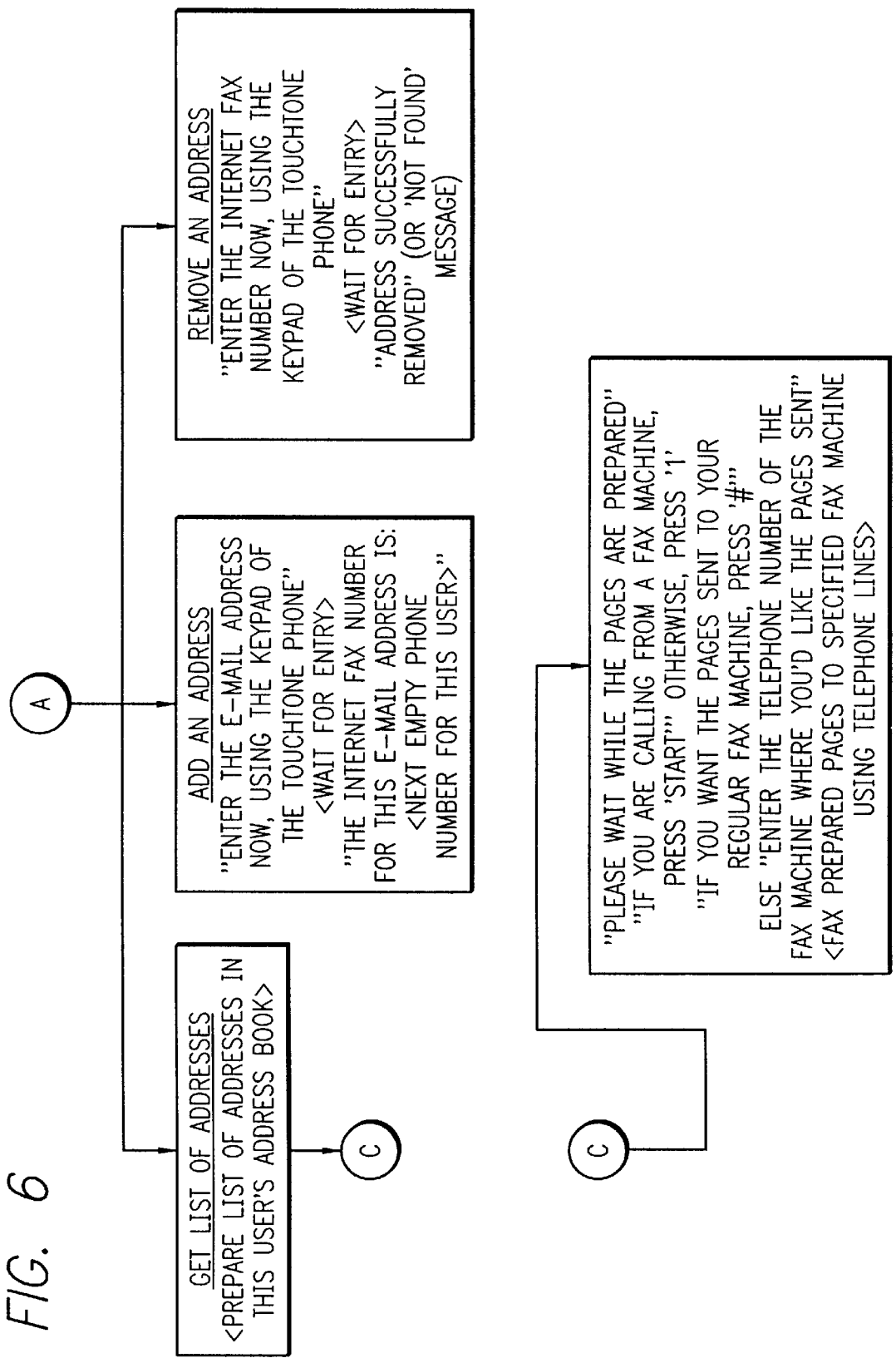

FIG. 6 shows details of the address book options. If the user selects "get list of addresses," the system prepares pages containing the printed contents of the user's address book (i.e., the e-mail address and assigned internet fax numbers for each entry) and control passes to step C of FIG. 6 (described below), where the prepared pages are faxed to the user at the specified fax machine.

If the user selects "add an address," the system prompts the user for the e-mail address of the new entry, places the e-mail address in the next empty internet fax number in the user's address book, and echoes the new internet fax number to the user. If the user selects "remove an address," the system prompts the user for the internet fax number of the new entry, removes the entry corresponding to the internet fax number from the user's address book, reserves the vacated internet fax number for later assignment, and echoes a "successful completion" message to the user.

Step C of FIG. 6 is repeated for a number of functions in the described embodiment and, thus, is described separately in the following paragraph. After the system has prepared one or more pages of information to be faxed to the user, the system prompts the user for the location of the fax machine to which to send the pages. In the described embodiment, the system prompts the user that, if he is calling from a fax machine, he should press the "start" key on the fax machine. Since a telephone connection already exists between the system and the fax machine, the prepared pages are sent to the fax machine without further complication. If the user is not calling from a fax machine, the system asks the user whether he wants his pages sent to his designated regular fax machine. If the user so desires, the pages are sent. If not, the user can enter the telephone number of a fax machine where he wishes the pages sent.

Allowing the user to specify the location of the fax machine where he wishes to send information allows a user to have his information sent to the fax machine nearest his present location. This feature is extremely valuable to users who travel or who do not own their own fax machine.

ii) Message Archive

Figure 7:
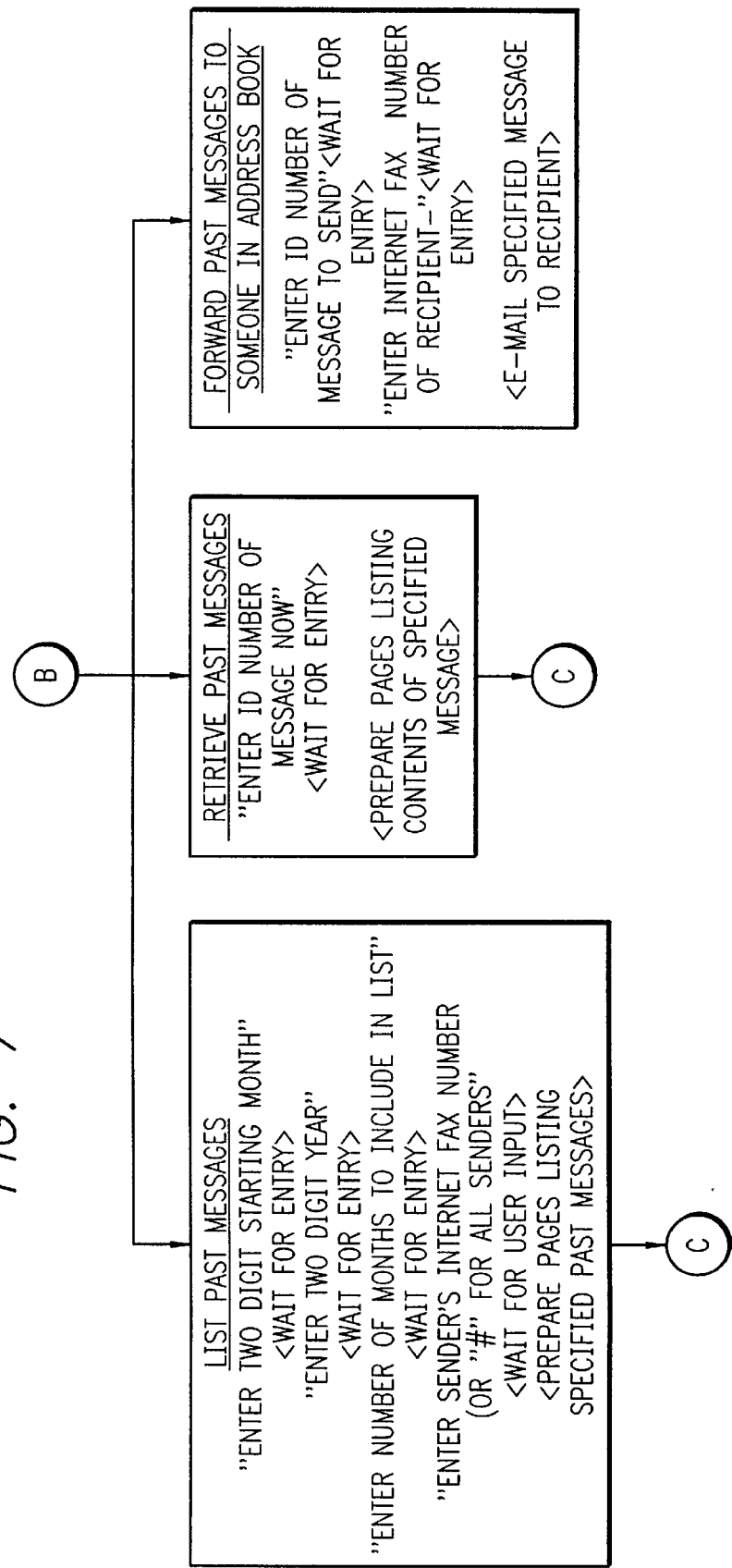

If the user selects "Message archive," the user is presented with three more choices: List past messages; Retrieve past messages; and Forward past messages. FIG. 7 shows details of each of these options.

Figure 9B:
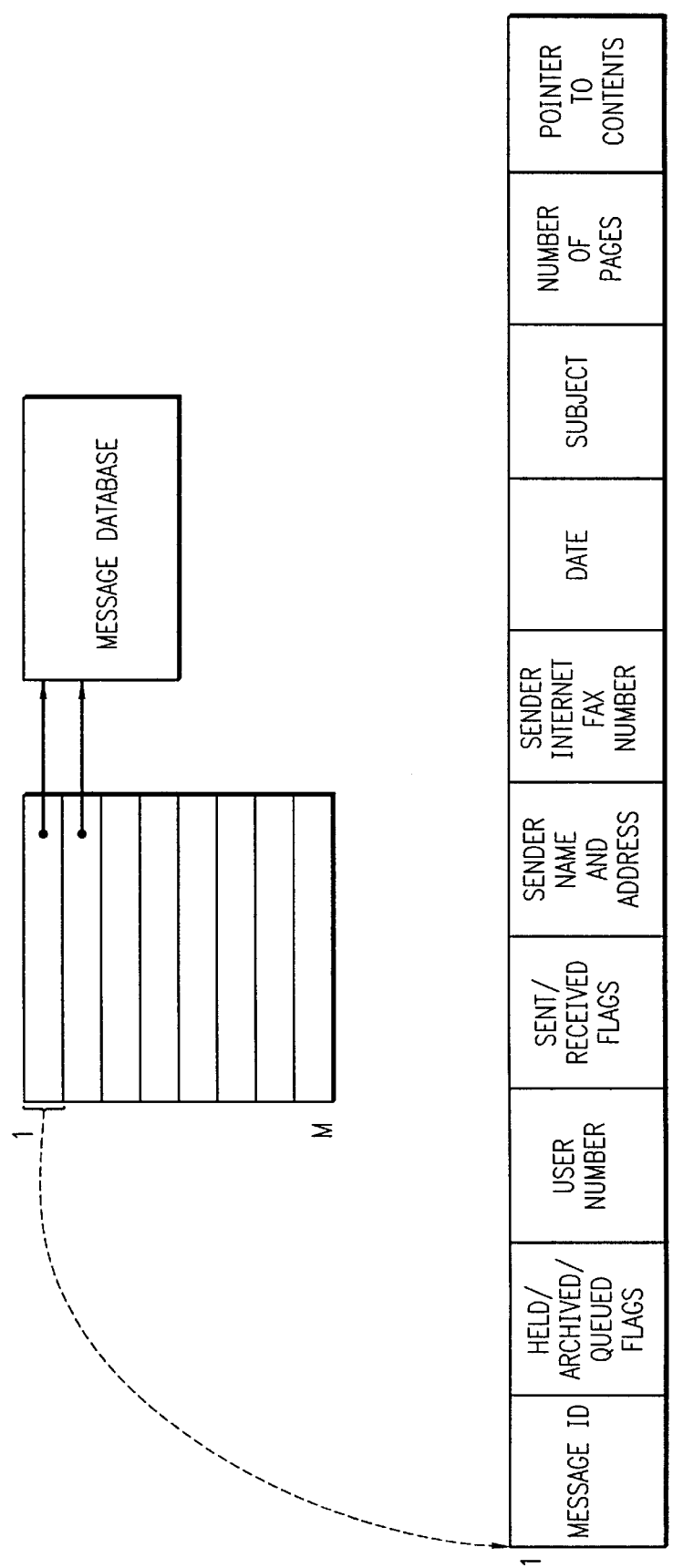
FIG. 9(b) shows an example format of a database storing messages received by a user.

FIG. 9(b) shows an example data structure for storing messages received by a user. Each message is assigned a message id and has one or more flags indicating whether the message has been read by the user and whether the user has archived the message.

If the user selects "List past messages," the user is prompted to determine which past messages the user wishes to view (by month and year) and the system prepares pages containing a printed list (sender, date, messages id, subject, and number of pages) of the messages specified by the user. Control then passes to step C of FIG. 6, where the prepared pages are faxed to the user at the specified fax machine. A preferred embodiment of the present invention also allows the user to retrieve listings of past messages sent/received from a specific person in the user's address book.

If the user selects "Retrieve past messages," the user is prompted to specify which past messages the user wishes to view (by message id) and the system prepares pages containing of the contents of the specified messages. Control then passes to step C of FIG. 6, where the prepared pages are faxed to the user at the specified fax machine.

If the user selects "Forward past messages to someone in address book," the user is prompted to specify which past messages the user wishes to send and to which internet fax number he wishes to send them. The system then prepares pages containing of the contents of the specified messages and the prepared pages are e-mailed to the specified recipient.

iii) Change Reception and Security Modes

As shown in FIG. 5, the user can toggle between two reception modes: Reception on Request and Direct Reception. Reception on Request means that e-mail messages sent to the user are held until the user calls in for them. Direct Reception means that e-mail messages received for the user are sent directly to his designated fax machine. Reception on Request is useful if a user travels a great deal and is not near the same fax machine very often. Direct Reception is useful for those who are consistently near their fax machine, since received messages are printed by the fax machine without waiting for action by the user.

As shown in FIG. 5, the user can also toggle security on or off. If security is on, the user must send messages via the remote send method, as discussed above. Remote send requires that the user enter an account number and a password before sending the message. In some implementations, the user must enter his account number and password to change security options, even though he has already entered it to log in to the IVR system.

c) Power Retrieval Menu

If the user selects the third option on the Power User menu (i.e., Power Retrieval), the user is prompted with three more choices: List held messages, Retrieve held messages, and Move unread messages to archive. The Power retrieval choice is offered only if the user has previously indicated that he wishes to have a reception mode of "Reception on Request."

Figure 8:
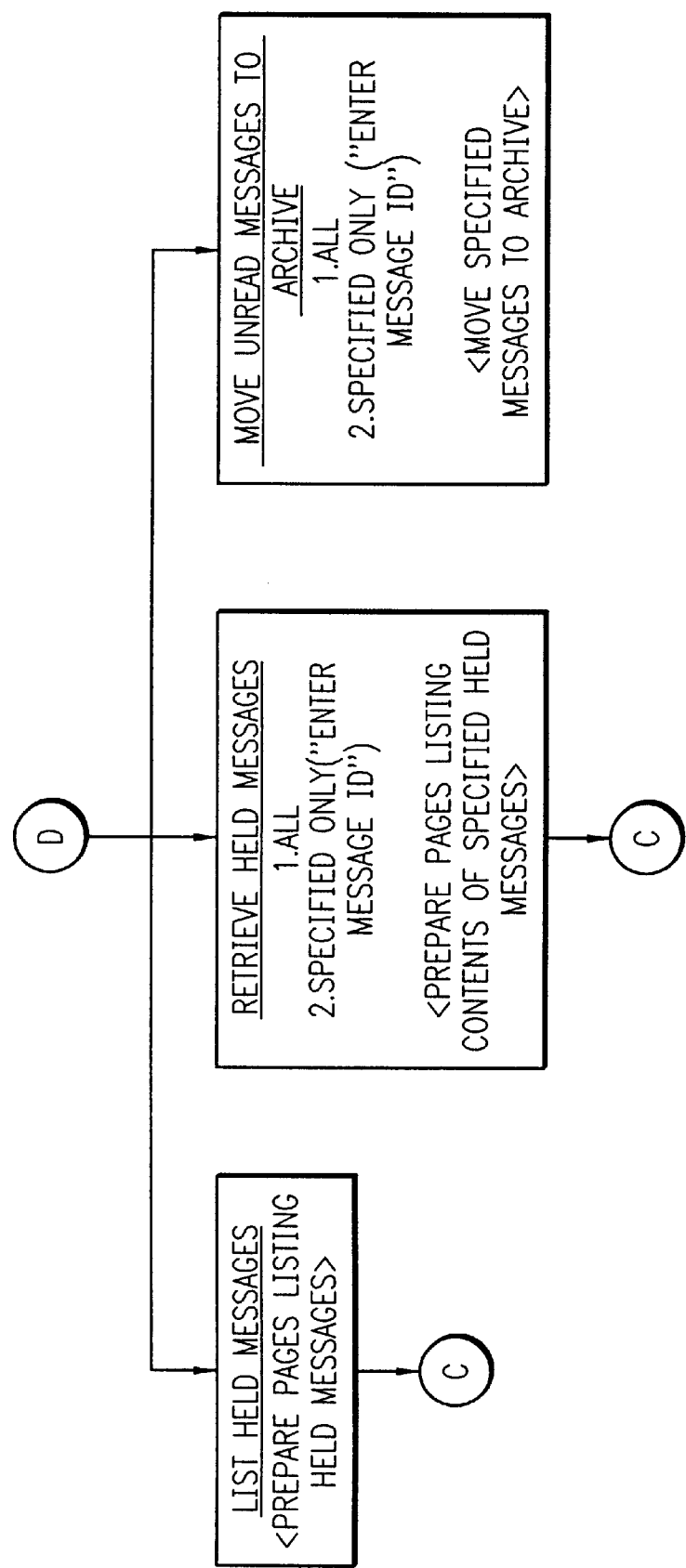

FIG. 8 shows details of Power Retrieval. If the user selects List held messages, the system prepares pages listing the user's unread messages, including the message id of each message, and control passes to step C of FIG. 6, where the prepared pages are faxed to the user at the specified fax machine. If the user selects Retrieve held messages, the system prompts the user for the message id of the message(s) to retrieve (or for a directive to send all held messages) and prepares pages listing the contents of the user's specified messages. Control then passes to step C of FIG. 6, where the prepared pages are faxed to the user at the specified fax machine. If the user selects Archive unread messages, the system prompts the user for the message id of the message(s) to move (or for a directive to move all held messages) and moves the message to the archive.

III. Administrative Site

Figure 10:
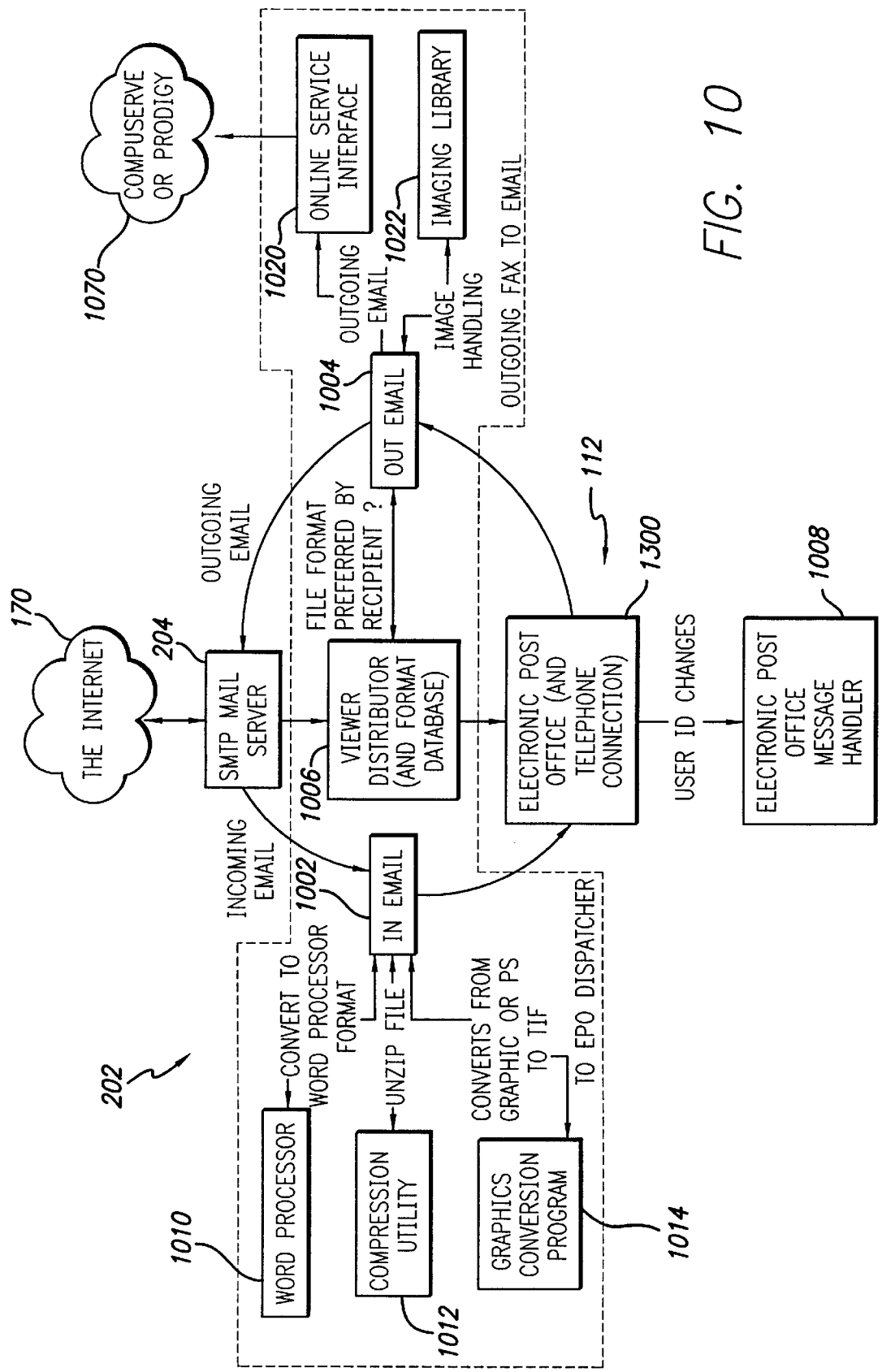
FIG. 10 is a block diagram of flow between elements of an administrative system and an Electronic Post Office (EPO) of FIG. 1.

FIG. 10 is a block diagram of flow between elements of administrative site 100 of FIG. 1 communicating with an EPO, such as EPO 112 of FIG. 1. Administrative site 100 shares a file system with the EPOs. The file system contains messages to be sent to users' facsimile machines by the system. Administrative site 100 communicates with the EPOs via FTP (File Transfer Protocol) or any appropriate messaging system.

In administrative site 100, SMTP server 204 receives and sends e-mail messages to and from the internet 170. EPO 112 includes a connection to telephone line 103. Administrative site 100 includes a database that keeps track of recipients' preferences. The recipients are not necessarily customers/users of the system. Instead, they are persons who have, at one time or another, received an e-mail from a user of the system. These recipient preferences include preferences for each recipient of viewing software and formats to which received faxes are converted before being sent as e-mail to a recipient.

Administrative site 100 includes an InMail process 1002 and an OutMail process 1004, each of which is described below in turn. InMail process 1002 accepts an e-mail message received by SMTP server via the internet, processes it, and sends it to the EPO to be faxed to the correct user. OutMail process 1004 accepts a facsimile message received from a fax machine, processes it, and sends it to SMTP server 204 to be sent to the correct recipient via the internet.

Figure 11:
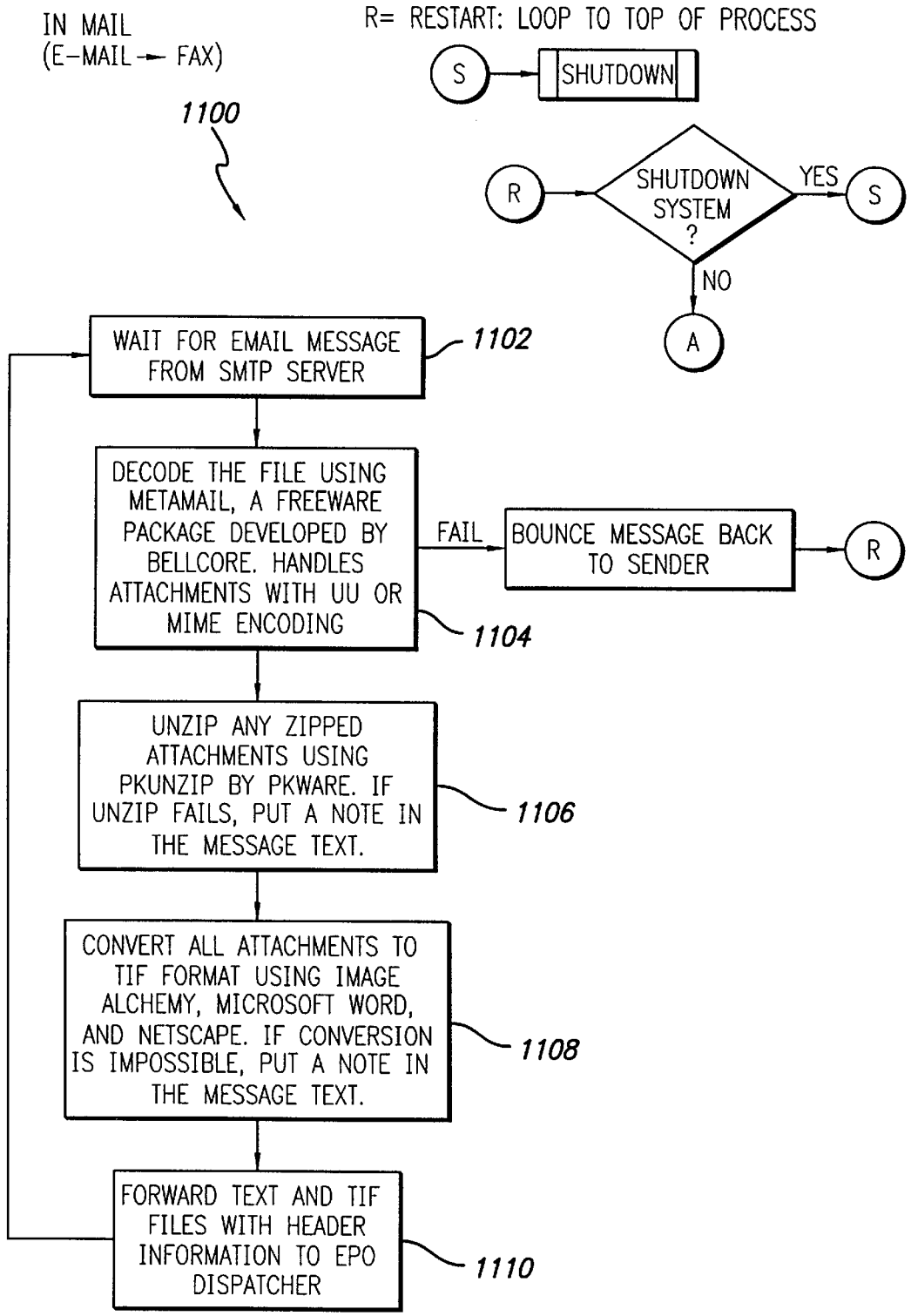
FIG. 11 is a flow chart of steps performed by an InMail process of FIG. 10.

In step 1102 of FIG. 11, Inmail process 1102 waits for an e-mail message from SMTP server 204. If an e-mail message is received, the process decodes the e-mail message. This step is preferably done using METAMAIL, a freeware package developed by BellCore, which handles e-mail attachments with UU or MIME encoding. In step 1106, any compressed attachments are decompressed. For example, files compressed with PKWare's PKZIP product are unzipped. If the decompress fails, the InMail process inserts a note to that effect in the message text.

In step 1108, the process converts all attachments to TIF format. In the described embodiment, this step is performed using Image Alchemy, manufactured by Handmade Software; by using Microsoft Word; and by using Netscape Navigator. If the conversion process fails, the InMail process inserts a note to that effect in the message text. In step 1110, the process forwards the text and TIF information to the EPO machine, where it is picked up by the dispatcher process of the EPO. The EPO will send a fax to the user, as described below in connection with FIG. 13.

The described embodiment of the present invention converts received e-mail to a TIF file for faxing. Other implementations of the present invention may convert e-mail to GIF format, or any other appropriate format. This implementation offers GIF and PostScript as well.

The described embodiment converts received faxes to a recipient specified format before e-mailing. Conversion of fax messages to TIF or any similar format has the advantage that the user can fax graphical information as well as text to the recipient. Use of TIF or similar formats has a disadvantage that the recipient must have the correct viewing software to read the received message.

In step 1202 of FIG. 12, the OutMail process waits for a fax message from an EPO. The fax message needs to be converted to an e-mail message and sent out. When a message is received, control passes to step 1204, where the file containing the message is locked so that no other Mail Processing Agent will "grab" the message. In step 1206, the OutMail process reads a header of the received e-mail message. If there is an error in the header, an error message is bounced back to the sender. The process extracts the e-mail address of the sender from the header and, in step 1210, determines whether the recipient has ever received e-mail from the system. If the recipient is a new recipient, he is added to a recipient database (not shown) and a TIF viewer (or any other appropriate viewer) is sent to the recipient via e-mail so that he swill be able to read his incoming message when it arrives.

The described embodiment of the present invention converts received fax messages to a graphics file before sending it as e-mail. In step 1216, the outgoing e-mail is converted to a graphical format preferred by the recipient (as indicated by the recipient database). If the recipient has not indicated a preference (via an email command system, not shown), the facsimile message is converted to TIF format. Other possibilities that the recipient can indicate include GIF, UU Encode, Mime, and PostScript.

In step 1218, the converted graphical image is stored in the recipient's mailbox in case the format changes in the future. For example, a recipient might indicate (via the e-mail command system) that he is changing his format preference to GIF. In this case, the system will resend his prior messages in GIF format. The converted graphical image is then sent to SMTP server 204 to be sent to the recipient via the internet.

IV. Electronic Post Office

Figure 13A:
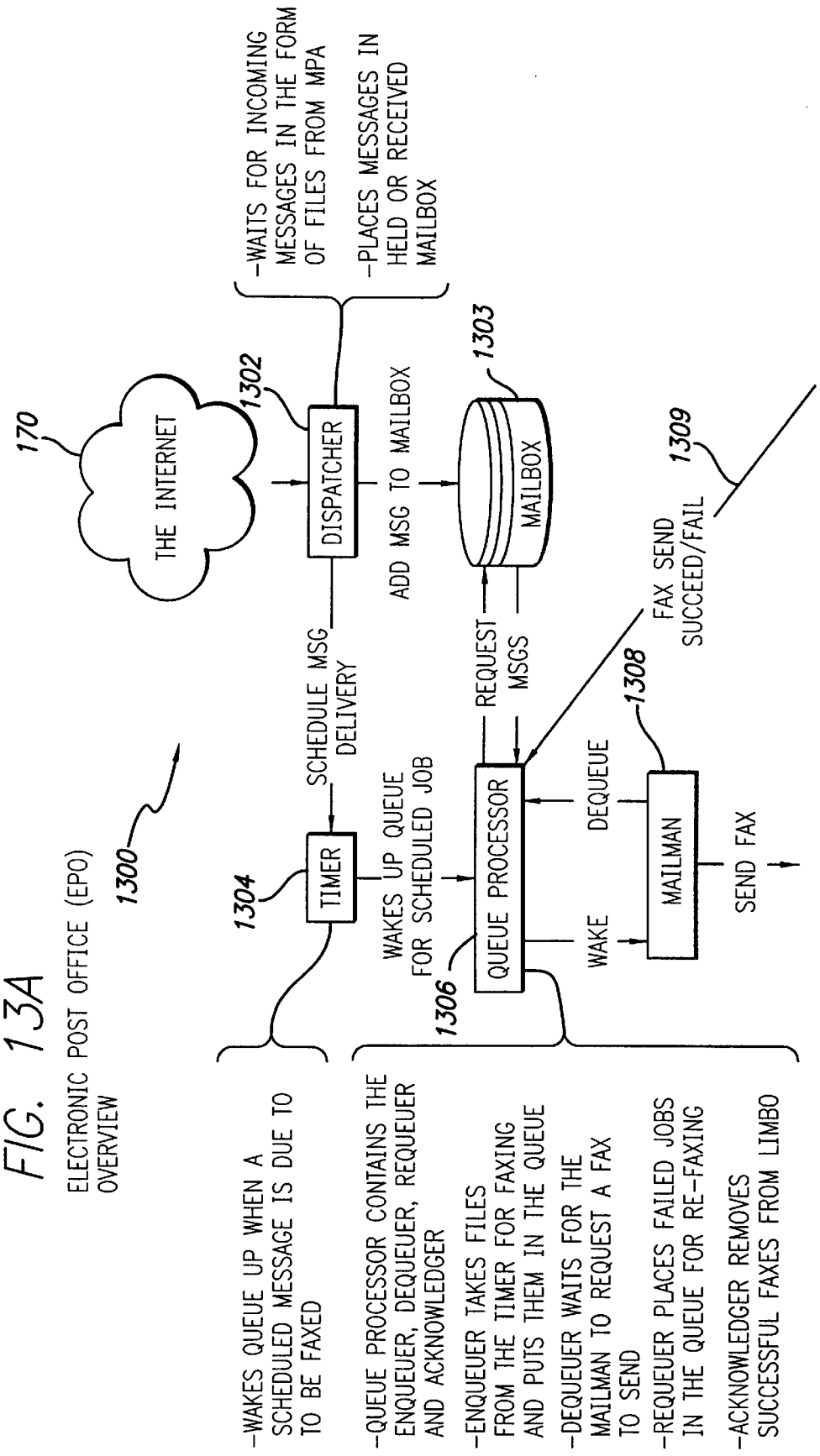
FIG. 13 is a flow diagram showing elements of the EPO of FIG. 10.
Figure 13B:
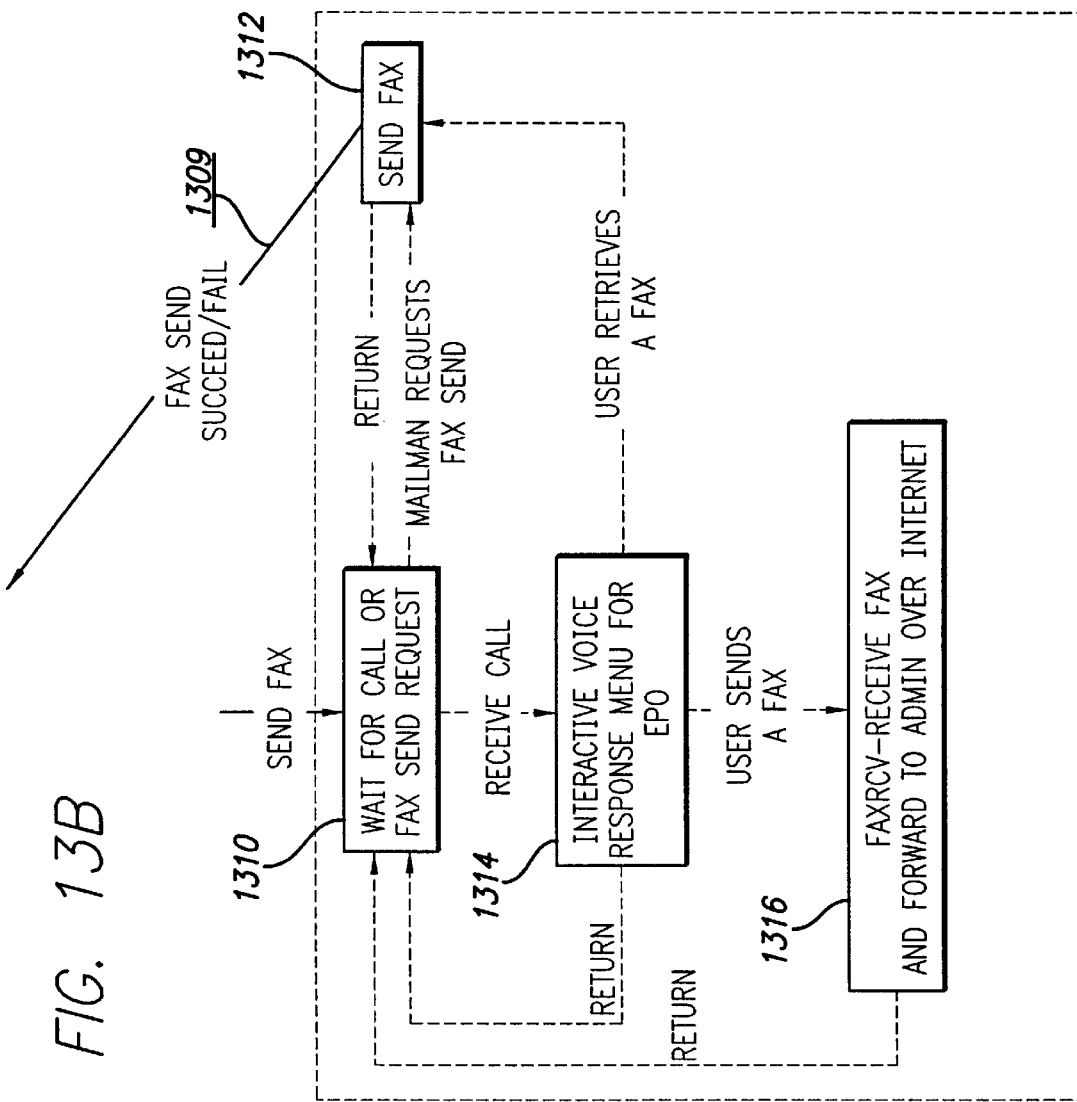

FIG. 13 is a flow chart showing elements of an EPO 1300. These elements include a Dispatcher 1302, a Timer 1304, a Mailbox 1303, a Queue processor 1306, a Mailman 1308, and a Call Processor 1309.

Figure 14B:
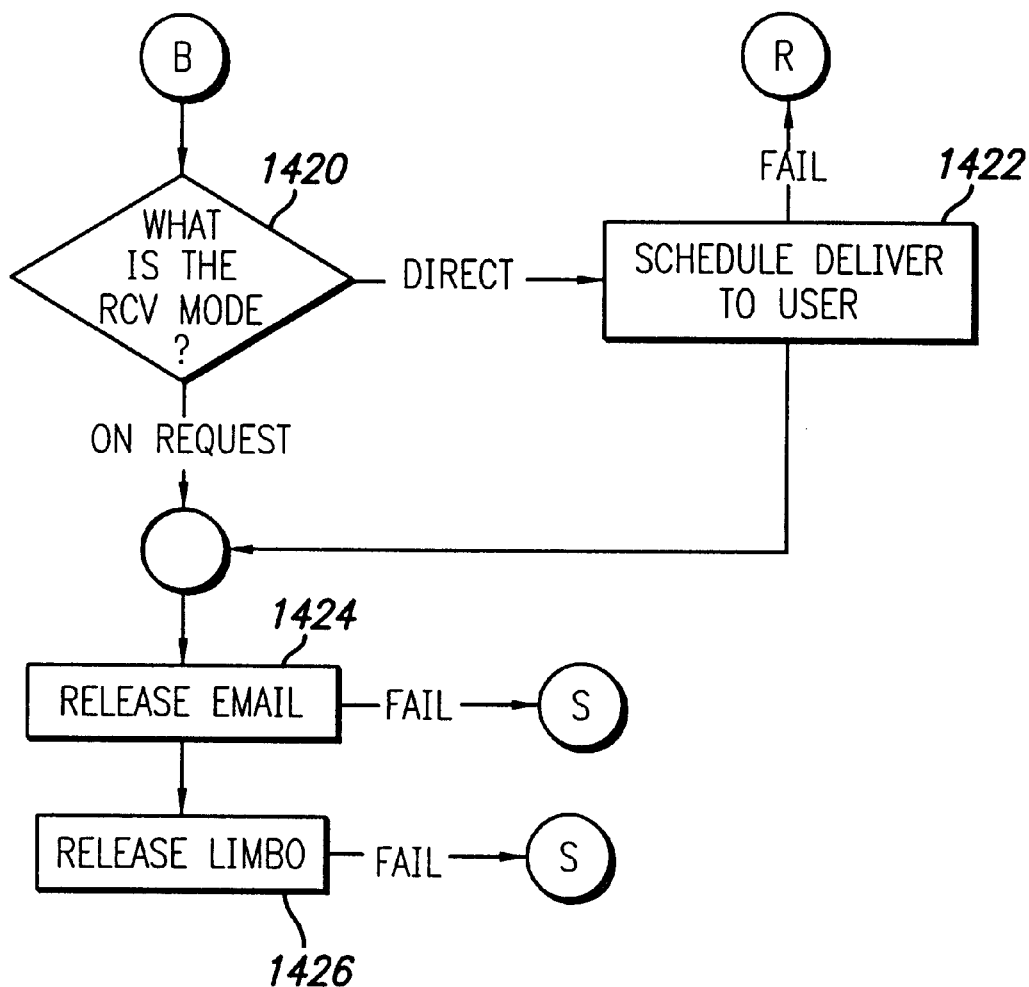
FIG. 14 is a flow chart showing steps performed by a Dispatcher of FIG. 13.

FIG. 14 is a flow chart showing steps performed by Dispatcher 1302 of FIG. 13. The dispatcher is connect to internet 170 so that it can receive messages from administrative site 100. When an e-mail message is processed by InMail process 1002, it is sent to the EPO dispatcher in step 1110 of FIG. 11 and received in step 1402 of FIG. 14. Step 1402 locks (reserves) the message for this process. If there is a message in the e-mail, control passes to step 1408, where the header is extracted. If an error occurs during header extraction, a message is bounced back to the sender in step 1410. In step 1412, the message is added to "limbo," which is a group of messages received but not available to the user because they are being processed.

In step 1414, if the sender's e-mail address is not in the user's address book, the address is added to the user's address book and an internet fax number is assigned to the sender.

In step 1416, if the user/recipient has selected Receipt on Demand, the message is added to the user's held mailbox in mailbox database 1303. Otherwise, if the user has selected Direct Receipt, the message is added to the user's received mailbox in mailbox database 1303. In step 1420, if the receive mode is Direct Receipt, then the message is scheduled to be delivered to the user in the near future. Step 1424 releases the hold on the message set in step 1402, which locked (reserved) the message for this process. Step 1426 releases the limbo status set in step 1412.

Figure 15:
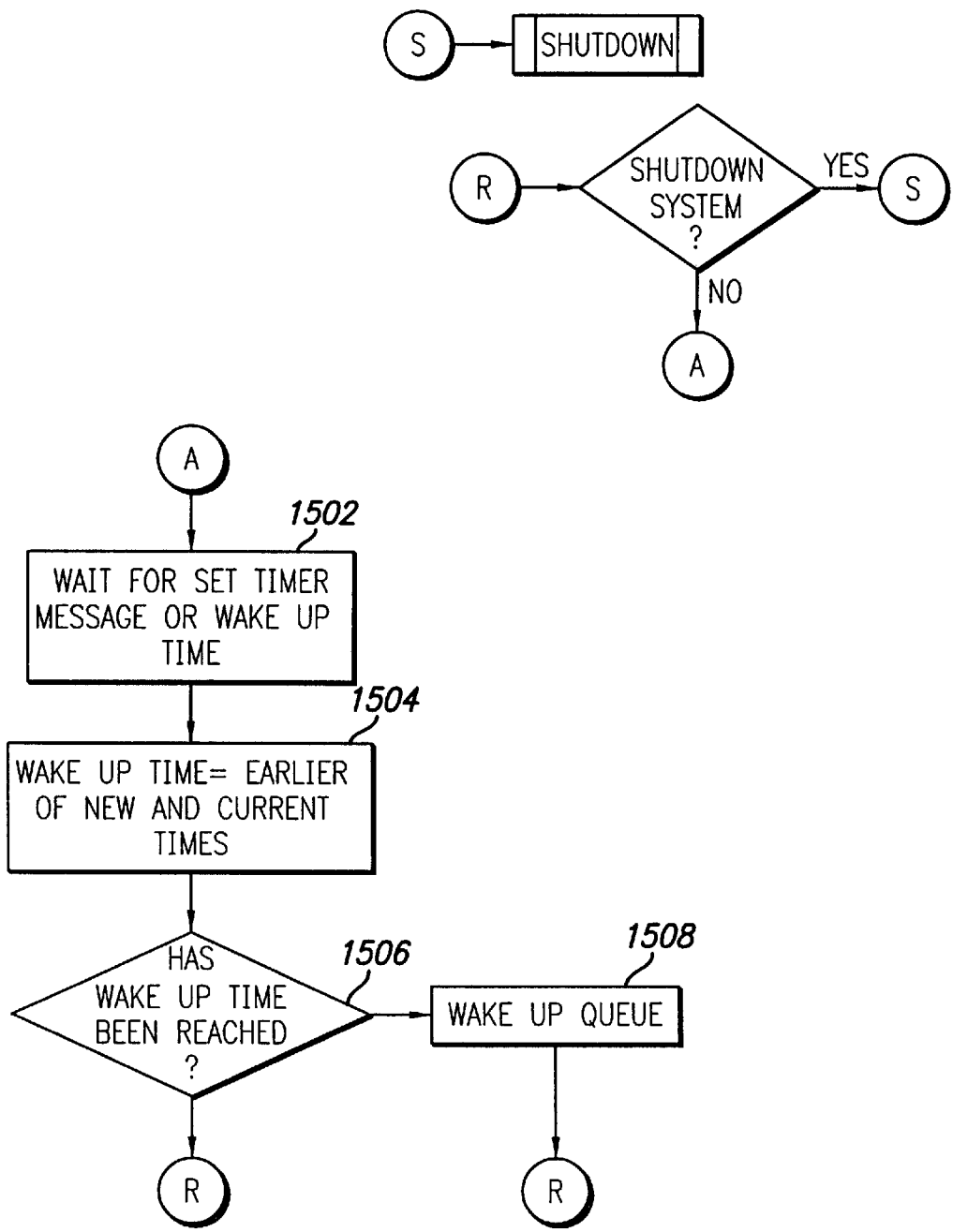
FIG. 15 is a flow chart showing steps performed by a Timer of FIG. 13.

FIG. 15 is a flow chart showing steps performed by a Timer of FIG. 13. In step 1502, the timer waits for a wakeup time to occur or for a set timer message. In step 1504, if a set time message occurs and it is earlier than the current wakeup time, then the new time becomes the wakeup time. In step 1506, when the wakeup time is reached, the timer notifies the queue processor that it is time to process a queued message.

Figure 16:
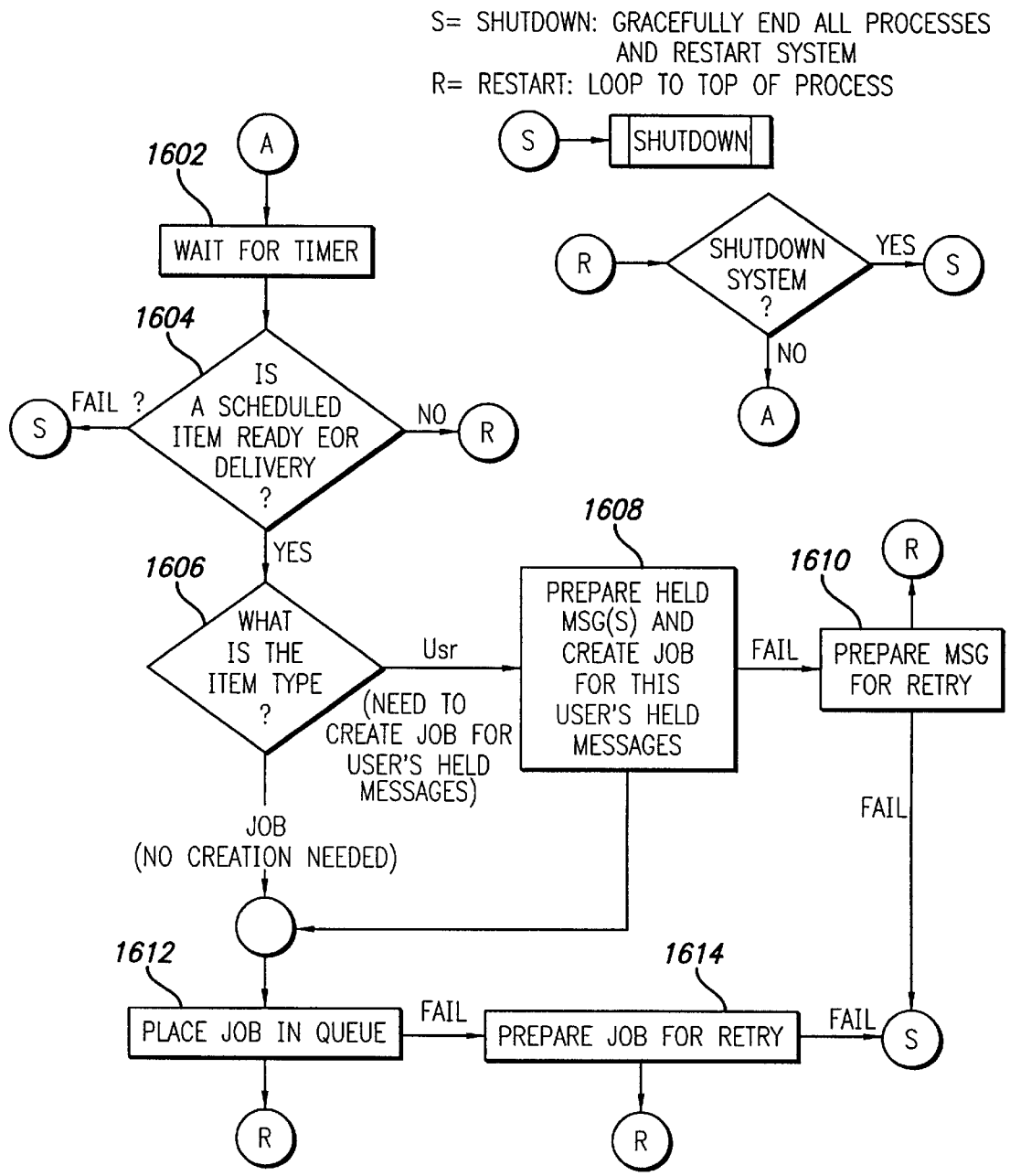
FIG. 16 is a flow chart showing steps performed by an Enqueuer process in a Queue processor of FIG. 13.

As shown in FIG. 13, the queue processor includes an enqueuer, dequeuer, requeuer, and acknowledger, the operation of which is shown, respectively, in FIGS. 16–19. FIG. 16 is a flow chart showing steps performed by the Enqueuer. The Enqueuer is notified by the timer that a job is ready for faxing, and puts the job in the queue. Step 1602 waits for the timer to pop. If, in step 1604, a scheduled item is ready for delivery, control passes to step 1606.

Figure 18:
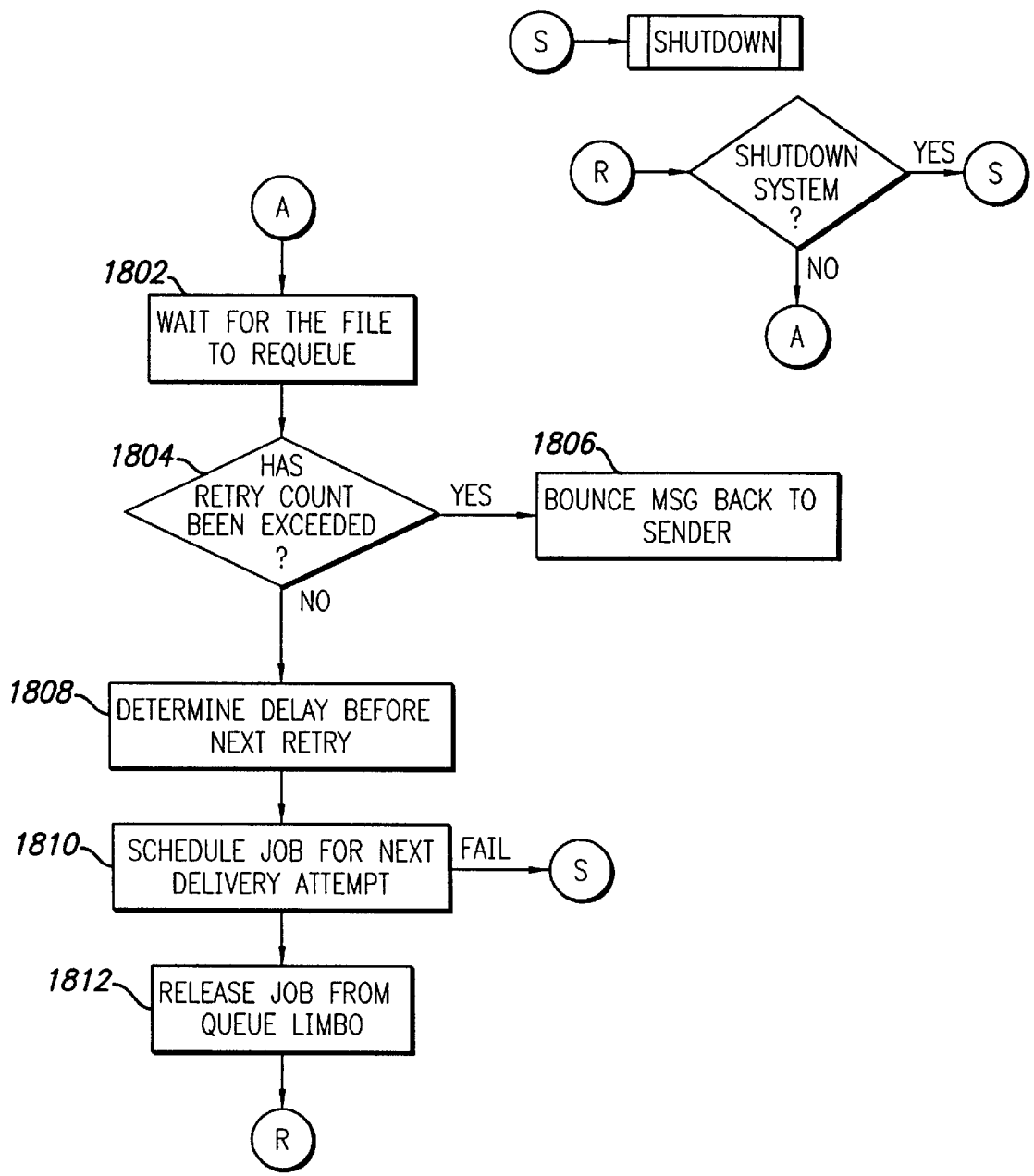
FIG. 18 is a flow chart showing steps performed by a Requeuer process in the Queue processor of FIG. 13.

A "job" is a file/message to be faxed. A "user" (in the context of FIG. 16) means that the system is to prepare all unread messages for the given user (i.e., create a job containing all unread messages and then fax the job). In step 1606, if the scheduled item is a job then step 1612 places the job in the queue. If step 1612 fails, the job is retried as shown in FIG. 18. If, in step 1606, the scheduled item is a user, the system creates a job for the user's unread messages in step 1608 and places the newly created job in the queue in step 1612.

Figure 17:
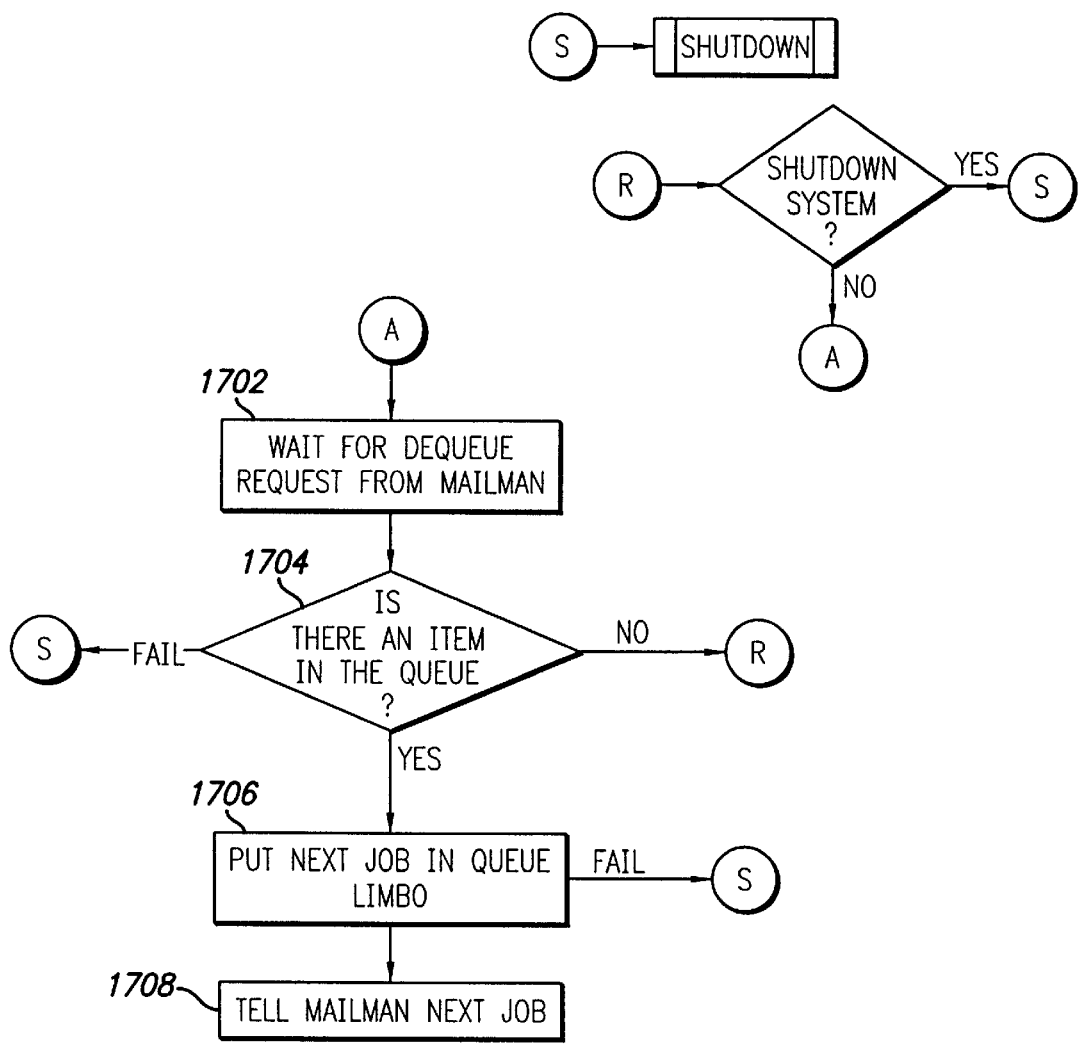
FIG. 17 is a flow chart showing steps performed by a Dequeuer process in the Queue processor of FIG. 13.

FIG. 17 is a flow chart showing steps performed by the Dequeuer. The dequeuer waits for the mailman to request a fax to send in step 1702. When such a request is received, if, in step 1704, there is an item in the queue, the item is removed from the queue, placed in "queue limbo" and passed to the mailman process to be faxed out.

FIG. 18 is a flow chart showing steps performed by the Requeuer. The requeuer places failed jobs back into the queue for re-faxing. Step 1802 waits for a file to requeue. When this occurs, the requeuer determines whether the file has exceeded a predetermined retry count value. If so, the message is bounced back to the sender in step 1806. If not, step 1808 determines an amount of delay to wait before retrying. The amount of delay can be based on any appropriate formula, such as "if the fax machine is busy, retry in three minutes; if the fax machine is out of paper, retry in four hours." Step 1810 schedules the job for a next delivery attempt. Step 1812 releases the job from queue limbo.

Figure 19:
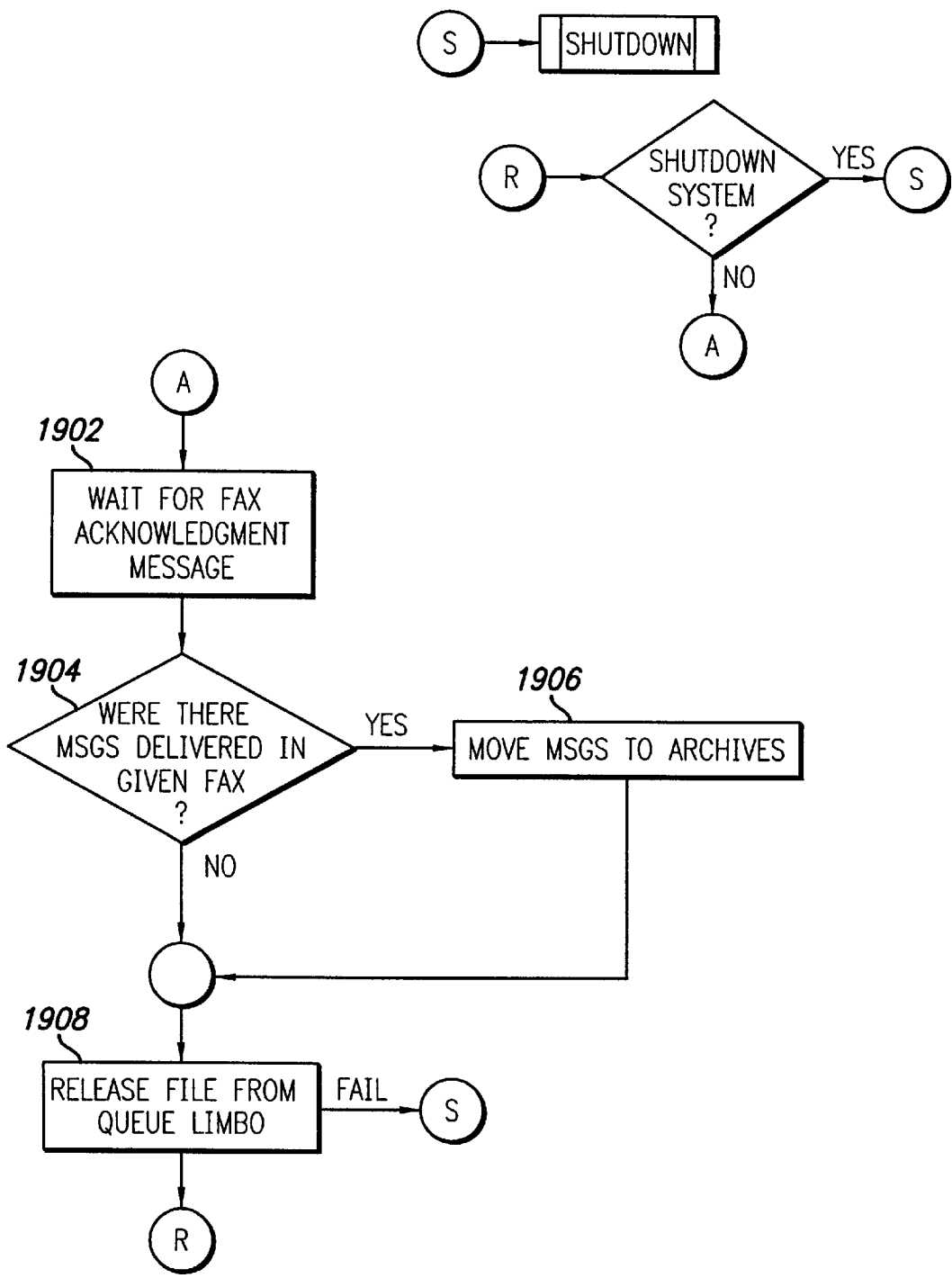
FIG. 19 is a flow chart showing steps performed by an Acknowledger in the Queue processor of FIG. 13.

FIG. 19 is a flow chart showing steps performed by an Acknowledger. The Acknowledger removes successful faxes from limbo (see step 1706 of FIG. 17). When, in step 1902, a fax acknowledgment message is received and if, in step 1904, there were messages delivered in the current fax, the delivered messages are moved to the archive. In either case, the file is released from queue limbo.

FIG. 20 is a flow chart showing steps performed by the Mailman process of FIG. 13. In step 2002, the Mailman requests the next job from the dequeuer. If no job is ready, the Mailman waits for the queue to tell it that a job is ready in step 2004. Otherwise, in step 2006, the Mailman notifies the call processor of the new job.

Figure 21:
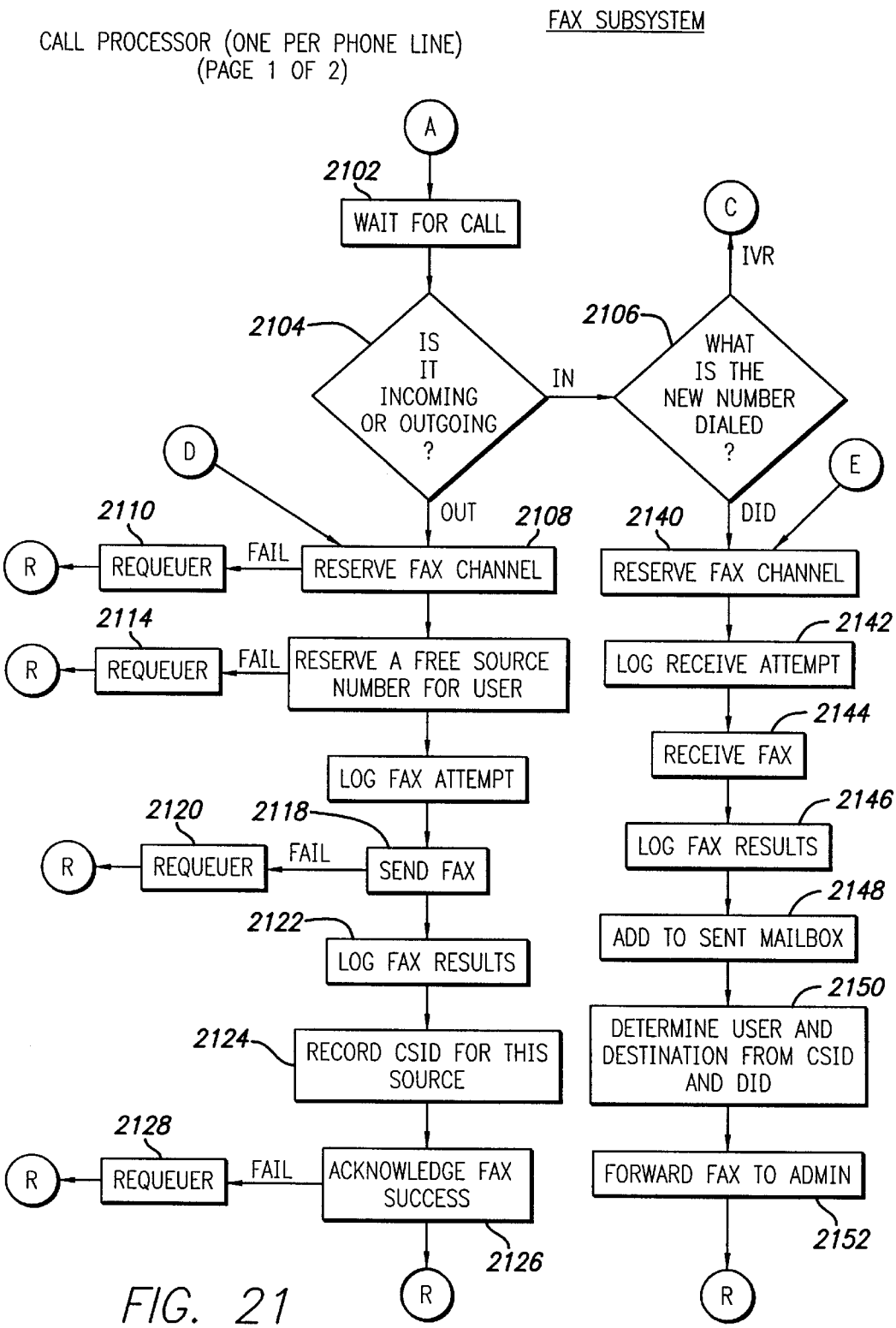
FIGS. 21 and 22 are flow charts showing steps performed by a Call processor of FIG. 13.
Figure 22:
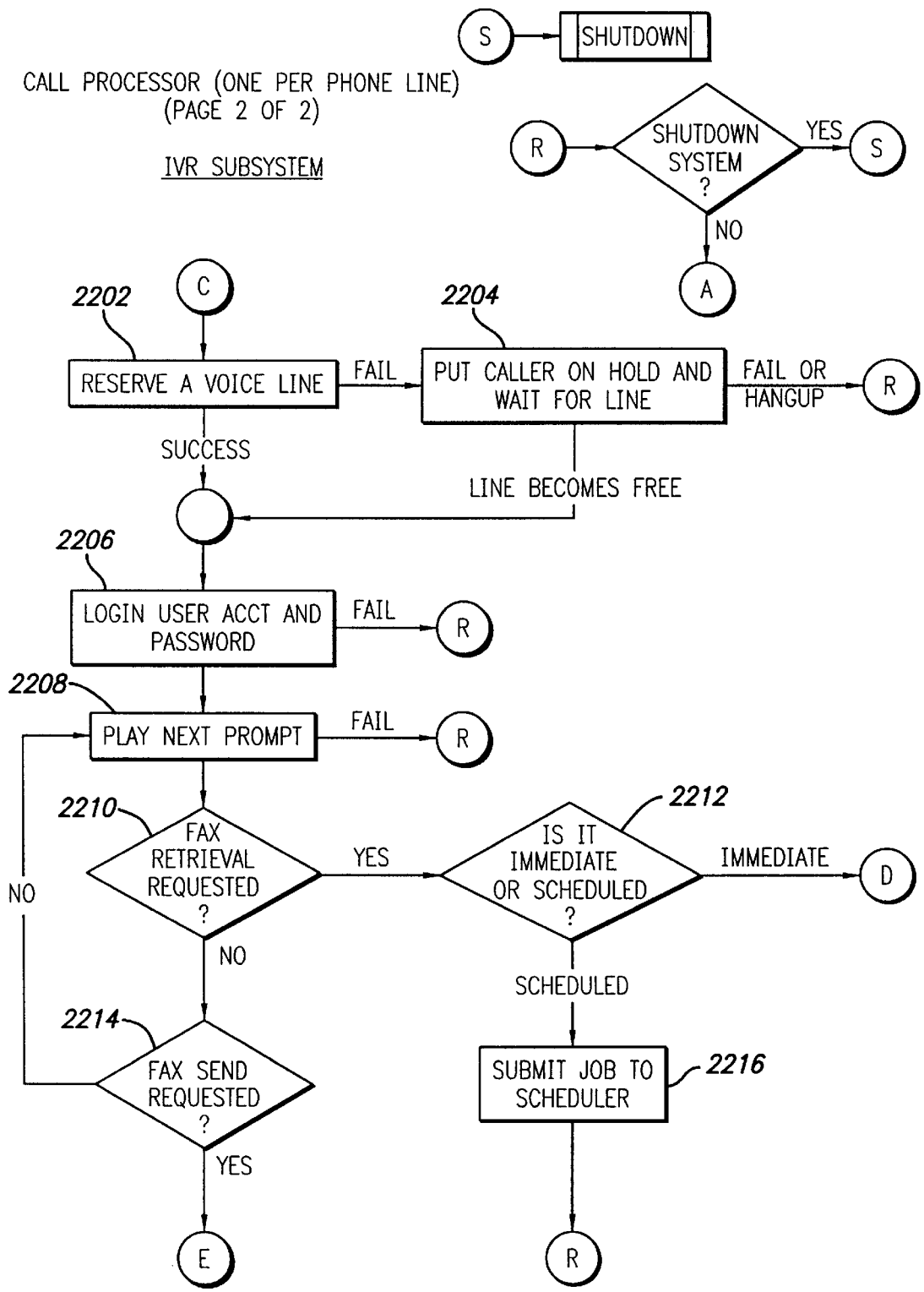

FIGS. 21 and 22 are flow charts showing steps performed by a Call processor of FIG. 13. A preferred embodiment of the present invention has one call processor process for each telephone line. The call processor waits for a call or fax send and may send or receive a fax depending on the type of call. It also presents voice menus to callers accessing the EPO and processes their responses.

In steps 2102 and 2104, once a call has been received, the call processor determines whether the call is incoming (to the EPO) or outgoing (from the EPO). If the call is outgoing, the call processor performs steps 2108 though 2126. If the call is incoming, the call processor performs steps 2140 through 2216 (of FIG. 22).

The following paragraphs discuss processing of an incoming call. In step 2106, the call processor determines whether the incoming call is for the interactive voice response (IVR) system (which handles user requests as shown in FIGS. 5–8) or whether the incoming call is from a fax machine. If the call is for the IVR, the call will be made to the predetermined IVR telephone number. In this case, control passes to FIG. 22. If the incoming call is from a fax machine, control passes to step 2140.

In steps 2140 and 2142, the call processor reserves a fax channel and logs a fax receive attempt in a system log (not shown). In steps 2144 and 2146, the call processor receives the fax message and logs the fax results. The fax message is then added to send mailbox 1303. In step 2150, the call processor determines which fax machine originated the call by looking at the CSID (Customer Service ID) of the calling fax machine. Alternately, the calling fax machine can be identified by the caller ID number provided by the telephone company (if caller ID service is available). The customer service ID is the code sent from a conventional sending fax machine that identifies the fax number of the sending fax machine. Once the call processor knows the CSID of the calling fax machine, it also knows the identity of the user. The call processor then determines the e-mail address of the intended recipient by looking up the dialed number (the DID or "Direct Inward Dialing" number) in the user's address book. As discussed above, each user's book has a plurality of e-mail addresses associated with a corresponding plurality of DID numbers. If two users share a fax machine as their designated fax machine, a preferred embodiment of the present invention will assign internet fax numbers so that the internet fax numbers of the two users do not overlap. Thus, a combination of the CSID and the internet fax number serves to identify the user.

In step 2152, the fax message is forwarded to the OutMail process 1004 of FIG. 10, where it is converted to a graphics file and e-mailed to the intended recipient.

FIG. 22 shows steps performed when the call processor in an EPO processes an incoming IVR call from a user. If the system successfully reserves a voice line in steps 2202 and 2204, the call processor prompts the user for his account number and password. If these are valid, the call processor plays a first prompt (see user prompt tree of FIGS. 5–8) and processes the user's response.

If the user requests an operation that sends information to the user via fax (such as a request for a listing of the user's address book), control passes to step 2212. In step 2212, if the request is a type that is scheduled, a job is submitted to the scheduler in step 2216. If the job is to be performed immediately, control passes to step 2108 of FIG. 21 and the requested information is faxed to the user immediately. An example of a scheduled job is when the caller types in a fax number to which he wants his pages sent. In an immediate job, the caller is calling from his fax machine and presses the "start" button during the call.

If, the user request involves the user sending a fax (e.g., a remote send), control passes to step 2140 of FIG. 21. Otherwise, control returns to step 2208 to process more user IVR requests.

In step 2108, if the message to be processed is an outgoing message, the call processor reserves a fax channel, and reserves a free source number for the user. In a preferred embodiment of the present invention, a user can have more than one fax machine registered. Each registered fax machine has a source number. If one registered fax machine is busy, the system will try each registered fax machine in turn. Step 2116 logs the attempted fax send and steps 2118 and 2122 send the fax and log the fax results. Step 2124 records the CSID for this source in a source database (not shown). The CSID is recorded so that, if the system gets a call from a fax machine with a recorded CSID, it will identify it with the recorded source. (this is an implementation detail added to handle the case where a fax machine's CSID does not match its fax number).

Step 2126 instructs Acknowledger of FIG. 19 to acknowledge the successful fax. Note that failure in any of steps 2108, 2112, 2118, or 2126 causes the outgoing fax message to be requeued and retried again at a later time.

Figure 23:
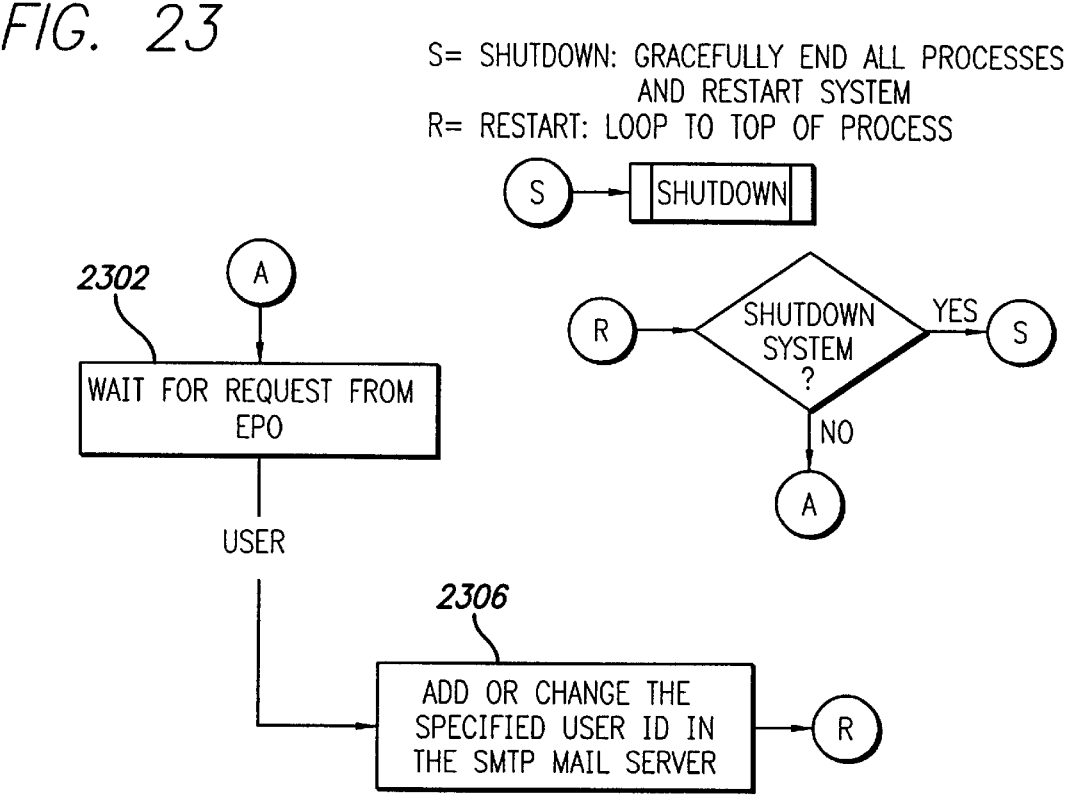
FIG. 23 is a flow chart showing steps performed by an EPO request handler of FIG. 10.

FIG. 23 is a flow chart showing steps performed by an EPO request handler 1008 of FIG. 10. Handler 1008 interacts with the EPO to change a user ID. In steps 2302 and 2304, the handler receives a request from the EPO and determines its type. If the request is to change the user ID, then, in step 2306, the specified user ID is added or changed in the SMTP mail server 204.

Figure 24:
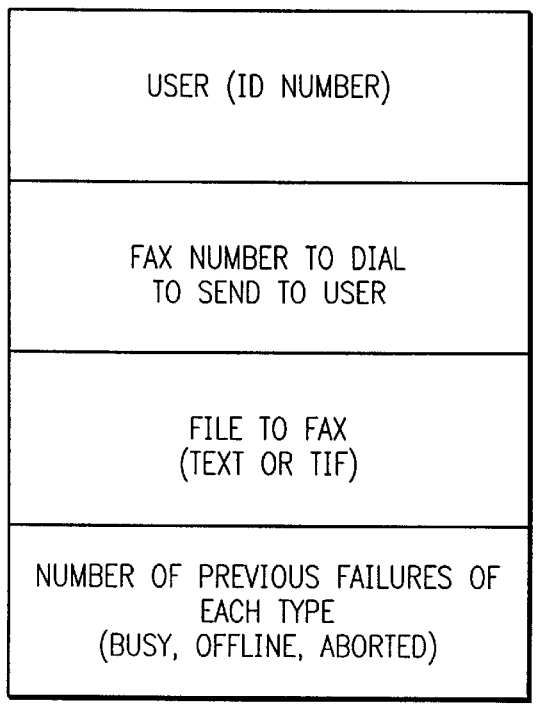
FIG. 24 shows an example format of a "job" entry in a queue data structure used in a preferred embodiment of the present invention.

FIG. 24 shows an example format of a "job" entry in a queue data structure used in a preferred embodiment of the present invention. Each job to be sent is entered in the queue, using the format of FIG. 24, as discussed above. If a user's held message(s) are to be sent, the system creates a queue entry for the held messages, using the format of FIG. 24. The format of FIG. 24 is provided for the purpose of example only. Other appropriate ways of handling messages could be used without departing from the scope of the present invention. In FIG. 24, each queue entry preferably includes a user id number (to identify the user), a fax number to dial to send a fax to the user, a file/message to fax (can be text or TIF), and a number of previous failures of various possible types.

V. Non-Ambiguous Entry of Alphanumeric Characters

A preferred embodiment of the present invention allows the user to enter alphanumeric information, such as e-mail addresses, via a touch tone telephone. Most telephone hands sets have the letters A–P and R–Y on the handset. Traditionally, the number "1" has been used for the letters "Q" and "Z", although any number or numbers can be used. The described embodiment uses a first, questioning inflection to echo a character as the user touches the key once, twice, or three times. After the user touches an "end" key, the system uses a second, declarative inflection to indicate that the character has been accepted by the system.

Figure 25B:
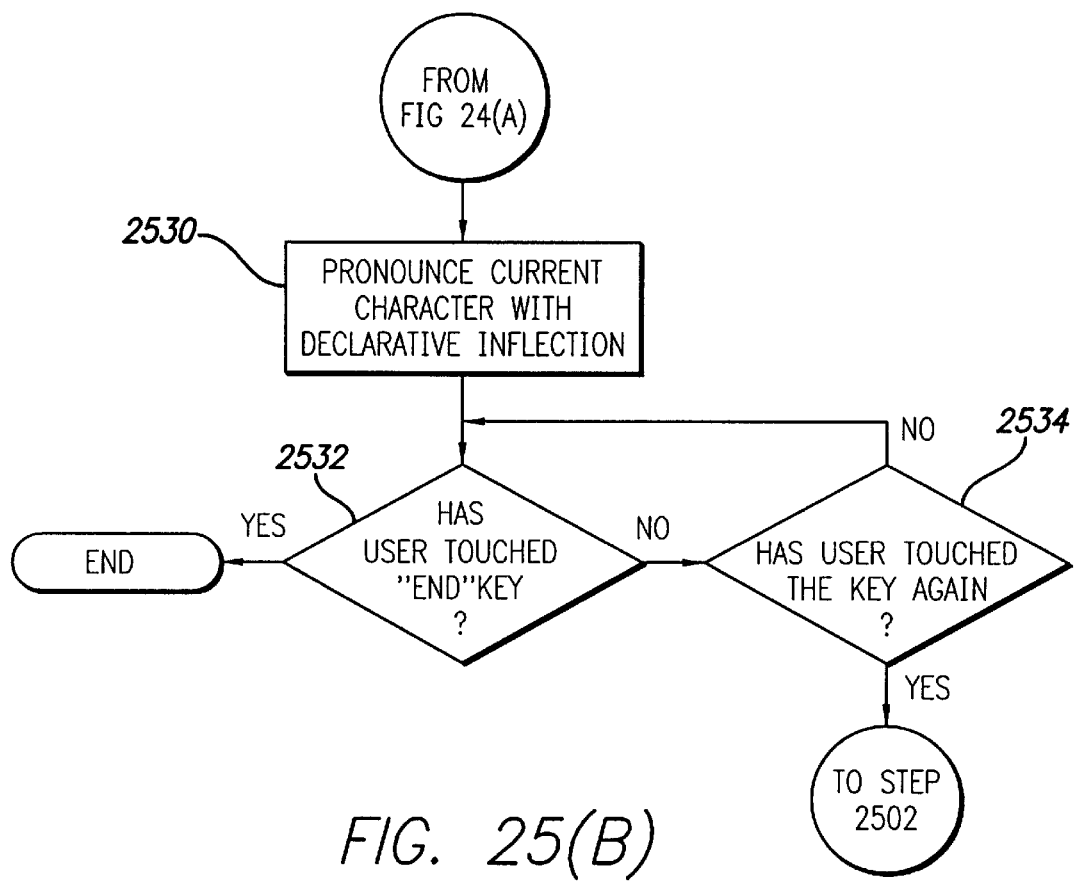
Figure 25C:
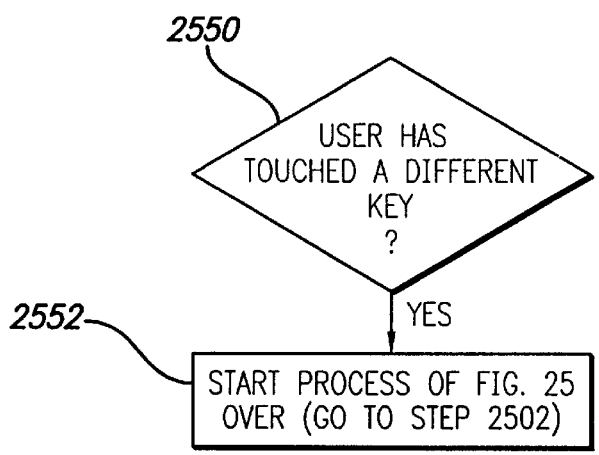

FIG. 25(*a*) shows an example of steps performed by the system to allow the user to enter an alphanumeric character via the keypad of a touchtone telephone so that the user is not confused when the character is spoken twice by the system. The described method can also be used for other types of systems where the user uses a keypad to enter information.

In step 2502 the user touches a key such as the "2" key one time. The system (assuming it has enough time before they next key press) pronounces the one-touch character (e.g., "A") with a first inflection, such as a questioning inflection. A questioning inflection implies that the system has not yet accepted the pronounced character and is awaiting more input.

If, in step 2506, the user touches the same key again, the system (assuming it has enough time) pronounces the two-touch character (e.g., B") with the first (e.g., questioning) inflection in step 2508. If instead, the user touches the "end" key (such as "#") in step 2504, control passes to step 2530 of FIG. 25(*b*). If, at any time, the user touches a different key (without touching the "end" key first), control passes to step 2550 of FIG. 25(*c*), which returns control to step 2502, so the process can be repeated for the newly pressed key.

If, in step 2512, the user touches the same key again, the system (assuming it has enough time) pronounces the three-touch character (e.g., C") with the first (e.g., questioning) inflection in step 2514. If instead, the user touches the "end" key in step 2510, control passes to step 2530 of FIG. 25(*b*).

If, in step 2518, the user touches the same key again, the system (assuming it has enough time) pronounces the four-touch character (e.g., "2") with the first (e.g., questioning) inflection in step 2520. If instead, the user touches the "end" key in step 2516, control passes to step 2530 of FIG. 25(*b*).

If the user touches the key a fifth time in step 2524, control passes to step 2502, where the process is repeated. If, after touching the key four times, the user touches the "end" key in 2522, control passes to step 2530 of FIG. 25(*b*).

In step 2530, the user has touched a key one, two, three, or four times, and has touched an end key to indicate that the user wishes to enter the indicated alphanumeric character. In this situation, the system echoes the indicated alphanumeric character with a second, declarative inflection, such as a steady (or falling) inflection. A declarative inflection implies that the system has accepted the user's entry. The difference between the first and the second inflection provides audio clues for the user as to why the character is being echoed two times (once when the user initially touches a key and once when the user indicates that he wants to enter a character). Such audio clues avoid user confusion and increase the accuracy of user entries in the system.

In summary, the present invention enables users having access to only a fax machine to send and receive e-mail easily. If the user selects a "Direct Receipt" receive mode, e-mail is automatically sent to his fax machine, where it can be printed out and read. If the user selects "Receipt on Demand," the user calls a predetermined telephone number and answers voice prompts to instruct the system where to fax his unread e-mail. In either case, the fax received by the user contains the contents of the e-mail message intended for the user. To send e-mail from his fax machine, the user establishes an "address book" of e-mail addresses, each of which is associated with a fax number (an internet fax number). If the user sends a fax message to an internet fax number associated with a particular recipient in the user's address book, the system sends an e-mail message containing the contents of the fax message to the recipient associated with the internet fax number.

Other embodiments will be apparent to those skilled in the art from consideration of the specification and practice of the invention disclosed herein. It is intended that the specification and examples be considered as exemplary only, with a true scope of the invention being indicated by the following claims and equivalents.

What is claimed is:

1. A system that enables a facsimile machine to behave like an e-mail client, comprising:

a portion that accepts input from a first user specifying an e-mail address of a second user;

a portion that automatically stores the e-mail address of the second user in an address book data structure assigned to only the first user in a memory;

a portion that associates an internet fax number with the stored e-mail address of the second user in memory; and a receiving portion that receives a fax from the facsimile machine of the first user that has been sent to the internet fax number associated with the e-mail address of the second user;

a selection portion for selecting from a set of at least one address book data structure the address book data structure assigned to only the first user that includes the internet fax number associated with the stored e-mail address of the second user; and a sending portion for sending the contents of the fax to the e-mail address of the second user stored in the selected address book data structure.

2. The system of claim 1, wherein the selecting portion further includes a portion that converts the fax message to TIF format.

3. The system of claim 1, where the selection portion includes a portion that determines that the received facsimile message is from the first user by checking one of a CSID and a caller ID number of the facsimile machine sending the message.

4. The system of claim 1, where the selection portion includes a portion that determines that the received facsimile message is from the first user because the first user sent the message via a remote send command.

5. A method for enabling a facsimile machine to act as an e-mail client, comprising the steps, performed by a data processing system, of:

receiving, from one of a computer system over the internet and a facsimile machine over telephone lines, an e-mail message addressed to a first user from a second user, and including an e-mail address of the first user and the second user, the first user being a user of the fax machine;

determining a telephone number of a facsimile machine assigned to the first user, in accordance with the e-mail address of the first user;

sending a facsimile message that contains the contents of the e-mail message to the determined telephone number; and selecting an address book data structure of the first user from a set of at least one address book data structure;

automatically adding the e-mail address of the second user to the selected address book data structure of the first user, along with a unique internet fax number of the first user, the selected address book data structure being stored in a memory.

6. A method for enabling a facsimile machine to act as an e-mail client, comprising the steps, performed by a data processing system, of:

receiving, from one of a computer system and a facsimile machine, an e-mail message addressed to a first user from a second user, and including an e-mail address of the second user, the first user being a user of the fax machine;

requesting from the first user, once the first user has issued a request to receive e-mail, a telephone number of a facsimile machine for receiving e-mails that are faxed to the first user;

receiving input from the first user specifying a telephone number of a facsimile machine;

sending, to the specified telephone number, a facsimile message that contains the contents of the e-mail message;

selecting an address book data structure assigned to only the second user from a set of at least one address book data structure;

automatically adding the e-mail address of the first user to the selected address book data structure of the second user, along with a unique internet fax number of the first user, the selected address book data structure being stored in a memory.

7. The method of claim 6, further including the step of notifying the user, using one of a pager or a telephone, when the e-mail message addressed to a first user from a second user is received.

8. A method for enabling a facsimile machine to act as an e-mail client, comprising the steps, performed by a data processing system, of:

receiving a facsimile message, sent from a facsimile machine by a first user, where the facsimile machine dialed an internet fax number associated with a second user;

determining the identity of the first user in accordance with a one of a CSID and a caller ID number of the facsimile machine;

selecting an address book data structure assigned to only the first user from a set of at least one address book data structure;

determining, from the selected address book data structure, an e-mail address of the second user, in accordance with the internet fax number dialed by the facsimile machine; and sending an e-mail message, containing the received facsimile message, to the second user at the determined e-mail address.

9. A system that enables a facsimile machine to behave like an e-mail client, comprising:

a portion that sends a first fax message to the facsimile machine, the first fax message including the contents of a first e-mail message sent by a second user to a first fax machine user, the first e-mail message including the e-mail address of the second user;

a portion that sends a second e-mail message to the second user in accordance with a second fax message received from the facsimile machine, the second fax message sent by the first user, the portion that sends the second e-mail message sending the second e-mail message in accordance with the identity of the first user, as determined by a one of a CSID and a caller ID number of the facsimile machine used to send the second fax message, and in accordance with a unique internet fax number assigned to the second user;

a portion that extracts, from the first e-mail message, the e-mail address of the second user;

a portion that selects an address book data structure assigned to only the first user from a set of at least one address book data structure; and a portion that adds the e-mail address of the second user to the selected address book data structure of the first user, along with an internet fax number assigned to the second user.

10. The system of claim 9, wherein the portion that sends the first fax message to the facsimile machine includes:

a portion requesting from the first user, once the first user has requested that his e-mail be sent to him, a telephone number of a facsimile machine to which the first user wishes his e-mail to be faxed;

a portion receiving input from the first user specifying a telephone number of a facsimile machine; and a portion sending, to the specified telephone number, the first facsimile message.

11. The system of claim 9, wherein the facsimile machine is a designated facsimile machine of the first user and wherein the portion that sends the first facsimile message includes:

a portion determining a telephone number of the facsimile machine, in accordance with an e-mail address of the first user; and a portion sending the first facsimile message to the determined telephone number.

12. A method of inputting an alphanumeric character, comprising the steps performed by a data processing system receiving input via a keypad, of:

receiving an indication that a user has touched a key on the keypad at least one time to enter the alphanumeric character;

verbally echoing the alphanumeric character corresponding to the touched key, using a first inflection when the user has touched a key on the keypad at least one time;

after the first echoing step, receiving an indication that the user has touched an "end" key on the keypad; and verbally echoing the character using a second inflection when the end key is pressed.

13. The method of claim of claim 12, where the first inflection is a questioning inflection and the second inflection is one of a steady inflection and a falling inflection.

* * * * *